(12) United States Patent
Caulfield et al.

(10) Patent No.: US 10,320,677 B2
(45) Date of Patent: Jun. 11, 2019

(54) FLOW CONTROL AND CONGESTION MANAGEMENT FOR ACCELERATION COMPONENTS CONFIGURED TO ACCELERATE A SERVICE

(71) Applicant: Microsoft Technology Licensing, LLC, Redmond, WA (US)

(72) Inventors: Adrian M. Caulfield, Woodinville, WA (US); Eric S. Chung, Woodinville, WA (US); Michael Papamichael, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 15/430,362

(22) Filed: Feb. 10, 2017

(65) Prior Publication Data

US 2018/0191617 A1 Jul. 5, 2018

Related U.S. Application Data

(63) Continuation-in-part of application No. 15/396,779, filed on Jan. 2, 2017.

(51) Int. Cl.
*H04L 12/801* (2013.01)
*H04L 12/823* (2013.01)

(52) U.S. Cl.
CPC .................................. *H04L 47/11* (2013.01)

(58) Field of Classification Search
CPC ........... H04L 47/11; H04L 47/12; H04L 47/32
See application file for complete search history.

(56) References Cited

U.S. PATENT DOCUMENTS 6,505,253 B1 1/2003 Chiu et al.
6,754,228 B1 6/2004 Ludwig
(Continued)

FOREIGN PATENT DOCUMENTS

EP 2472784 A1 7/2012
EP 3057334 A1 8/2016

OTHER PUBLICATIONS

Wu, et al., "ICTCP: Incast Congestion Control for TCP in Data-Center Networks", In Journal of IEEE/ACM Transactions on Networking, vol. 21, Issue 2, Apr. 2013, pp. 345-358.
(Continued)

*Primary Examiner* — Robert C Scheibel
(74) *Attorney, Agent, or Firm* — Ranjeev Singh; Singh Law, PLLC

(57) ABSTRACT

Systems and methods for flow control and congestion management of messages among acceleration components (ACs) configurable to accelerate a service are provided. An example system comprises a software plane including host components configured to execute instructions corresponding to a service and an acceleration plane including ACs configurable to accelerate the service. In a first mode a sending AC is configured to, in response to receiving a first indication from a receiving AC, send subsequent packets corresponding to a first message associated with the service using a larger inter-packet gap than an inter-packet gap used for previous packets corresponding to the first message associated with the service, and in the second mode the sending AC is configured to, in response to receiving a second indication from the receiving AC, delay a transmission of a next packet corresponding to the first message associated with the service.

19 Claims, 12 Drawing Sheets

(56) References Cited

U.S. PATENT DOCUMENTS

| | | | |
|---|---|---|---|
| 7,570,639 B2 | 8/2009 | Kalkunte et al. | |
| 8,027,284 B2 | 9/2011 | Kozat et al. | |
| 8,514,876 B2 | 8/2013 | Banerjee et al. | |
| 8,908,687 B2 | 12/2014 | Cheng et al. | |
| 8,953,618 B2 | 2/2015 | Mishra et al. | |
| 9,130,764 B2 | 9/2015 | Anumala | |
| 9,231,863 B2 | 1/2016 | Venkataswami et al. | |
| 9,253,140 B2 | 2/2016 | Kapadia et al. | |
| 9,374,270 B2 | 6/2016 | Nakil et al. | |
| 9,621,375 B2 * | 4/2017 | Giroux | H04L 12/2856 |
| 2006/0233100 A1 * | 10/2006 | Luft | H04L 41/0896 370/229 |
| 2007/0053356 A1 | 3/2007 | Konda | |
| 2009/0086637 A1 * | 4/2009 | DeCusatis | H04L 47/10 370/236.1 |
| 2009/0116387 A1 * | 5/2009 | Takai | H04L 47/10 370/235 |
| 2009/0175168 A1 * | 7/2009 | Wadekar | H04L 12/4013 370/235 |
| 2012/0054771 A1 * | 3/2012 | Krishnamurthy | G06F 9/4881 718/105 |
| 2013/0128735 A1 | 5/2013 | Li et al. | |
| 2015/0103837 A1 * | 4/2015 | Dutta | H04L 47/125 370/401 |
| 2015/0280928 A1 | 10/2015 | Tessmer et al. | |
| 2015/0280939 A1 * | 10/2015 | Sindhu | H04L 12/4641 370/236 |
| 2016/0204914 A1 | 7/2016 | Agee et al. | |
| 2016/0299553 A1 | 10/2016 | Putnam et al. | |
| 2016/0306668 A1 | 10/2016 | Heil et al. | |
| 2016/0306701 A1 | 10/2016 | Heil et al. | |
| 2016/0308649 A1 | 10/2016 | Burger et al. | |
| 2016/0308718 A1 | 10/2016 | Lanka et al. | |
| 2017/0111294 A1 * | 4/2017 | Laor | H04L 49/101 |
| 2017/0237672 A1 * | 8/2017 | Dalal | G06F 13/1652 370/235 |
| 2018/0191609 A1 | 7/2018 | Caulfield et al. | |

OTHER PUBLICATIONS

Zhu, et al., "Congestion Control for Large-Scale RDMA Deployments", In SIGCOMM, Aug. 2015, pp. 523-536.

Mittal, et al., "Timely: RTT-Based Congestion Control for the Datacenter", In SIGCOMM, Aug. 2015, pp. 537-550.

"Cisco Data Center Spine-and-Leaf Architecture: Design Overview", Retrieved from https://www.cisco.com/c/en/us/products/collateral/switches/nexus-7000-series-switches/white-paper-c11-737022.pdf, Jan. 2016, 27 Pages.

"Virtual Extensible Lan (VXLAN) Best Practices White Paper", In White Paper of Cisco, Jan. 2016, pp. 1-32.

Celoud, et al., "OpenContrail SDN Lab testing 1—ToR Switches with OVSDB", Retreived From: https://www.mirantis.com/blog/opencontrail-sdn-lab-testing-1-tor-switches-ovsdb/, Jul. 13, 2015, 27 Pages.

Chung, "AN3: A Low-Cost, Circuit-Switched Datacentre Network", Retrieved from: https://pdfs.semanticscholar.org/4c77/b517d603fce596338d1715083046t7e87676.pdf?_ga=2.36102368.118654212.1544767224-482396748.1535025123st-circuit-switched-datacenter-networkl, Mar. 12, 2014, 12 Pages.

Levine, et al., "A Comparison of Known Classes of Reliable Multicast Protocols", In Proceedings of International conference on Network Protocols, Oct. 29, 1996, 10 Pages.

Mcneil, Peter, "The Benefits of Layer 3 Routing at the Network Edge", Retrieved From: https://www.l-com.com/multimedia/whitepapers/wp_Layer3RoutingNetworkEdge.pdf, Mar. 23, 2012, 13 Pages.

"International Search Report Issued in PCT Application No. PCT/US17/067150", dated Apr. 12, 2018, 17 Pages.

Xia, et al., "A Cross-Layer SDN Control Plane for Optical Multicast-Featured Datacenters", In Proceedings of the Third Workshop On Hot Topics in Software Defined networking, Aug. 22, 2014, 2 Pages.

\* cited by examiner

FLOW CONTROL AND CONGESTION MANAGEMENT FOR ACCELERATION COMPONENTS CONFIGURED TO ACCELERATE A SERVICE

This application is a continuation-in-part of U.S. application Ser. No. 15/396,779, entitled "Transmission of Messages by Acceleration Components Configured to Accelerate a Service" filed on Jan. 2, 2017, the disclosure of which is incorporated herein in its entirety by reference.

BACKGROUND

Increasingly, users access applications offered via computing, networking, and storage resources located in a data center. These applications run in a distributed computing environment, which is sometimes referred to as the cloud computing environment. Computer servers in a data center are interconnected via a network and thus the applications running on the computer servers can communicate with each other via the network. In large data centers the communication of messages among the computer servers can cause congestion in the network resulting in poor performance. Traditional congestion control mechanisms in data centers use network switches to handle congestion management. The use of network switches results in the management of congestion at a coarse granularity with attendant downsides.

Thus, there is a need for methods and systems that alleviate at least some of these issues.

SUMMARY

In one example, the present disclosure relates to a system including a software plane including a plurality of host components configured to execute instructions corresponding to at least one service and an acceleration plane including a plurality of acceleration components configurable to accelerate the at least one service. Each of the plurality of acceleration components may be configurable as a sending acceleration component for sending messages for the at least one service or as a receiving acceleration component for receiving messages for the at least one service. Each of the messages may comprise a plurality of packets having an inter-packet gap. A sending acceleration component may be configured to operate in a first mode for the at least one service or in a second mode for the at least one service. In the first mode, the sending acceleration component may be configured to, in response to receiving a first indication from the receiving acceleration component, send subsequent packets corresponding to a first message associated with the at least one service using a larger inter-packet gap than an inter-packet gap used for previous packets corresponding to the first message associated with the at least one service. In the second mode, the sending acceleration component may be configured to, in response to receiving a second indication from the receiving acceleration component, delay for a configurable amount of time a transmission of a next packet corresponding to the first message associated with the at least one service.

In another example, the present disclosure relates to a method in a system comprising a plurality of endpoints coupled via a network, where each of the plurality of the endpoints may be configurable as a sending endpoint for sending messages or as a receiving endpoint for receiving messages, and where each of the messages comprises a plurality of packets. The method may include a first sending endpoint initiating transmission of first packets corresponding to a first message to a first receiving endpoint. The method may further include the first receiving endpoint storing the first packets in a first buffer associated with the first receiving endpoint and the first receiving endpoint transmitting a first indication to the first sending endpoint in response to the first buffer meeting a predetermined condition. The method may include the first sending endpoint increasing an amount of an inter-packet gap between successive first packets in response to the first indication. The method may further include a second sending endpoint initiating transmission of second packets corresponding to a second message to the first receiving endpoint. The method may further include if the first receiving endpoint is still receiving the first packets corresponding to the first message from the first sending endpoint, then the first receiving endpoint dropping the second packets and transmitting a second indication to the second sending endpoint. The method may further include the second sending endpoint processing the second indication and if the second indication corresponds to a first value, then the second sending endpoint delaying a transmission of a next second packet for a back-off period and transmitting the next second packet after an expiration of the back-off period, otherwise if the second indication corresponds to a second value, then the second sending endpoint not only delaying a transmission of the next second packet for a back-off period and transmitting the next second packet after an expiration of the back-off period, but also increasing an amount of an inter-packet gap between successive second packets.

In yet another example, the present disclosure relates to a method in a system comprising a plurality of endpoints coupled via a network, where each of the plurality of the endpoints is configurable as a sending endpoint for sending messages or as a receiving endpoint for receiving messages, and where each of the messages comprises a plurality of packets. The method may include a first sending endpoint initiating transmission of first packets corresponding to a first message to a first receiving endpoint. The method may further include the first receiving endpoint storing the first packets in a first buffer associated with the first receiving endpoint and the first receiving endpoint transmitting a first indication to the first sending endpoint in response to the first buffer meeting a predetermined condition, where the first indication comprises at least one of an expiration of a timer associated with a transmission of the first message, an explicit congestion notification from an elastic router associated with the receiving endpoint, or an explicit retransmission request for retransmitting at least one packet associated with the first message. The method may further include the first sending endpoint dynamically determining a back-off method and corresponding parameters for increasing an amount of an inter-packet gap between successive first packets in response to the first indication.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
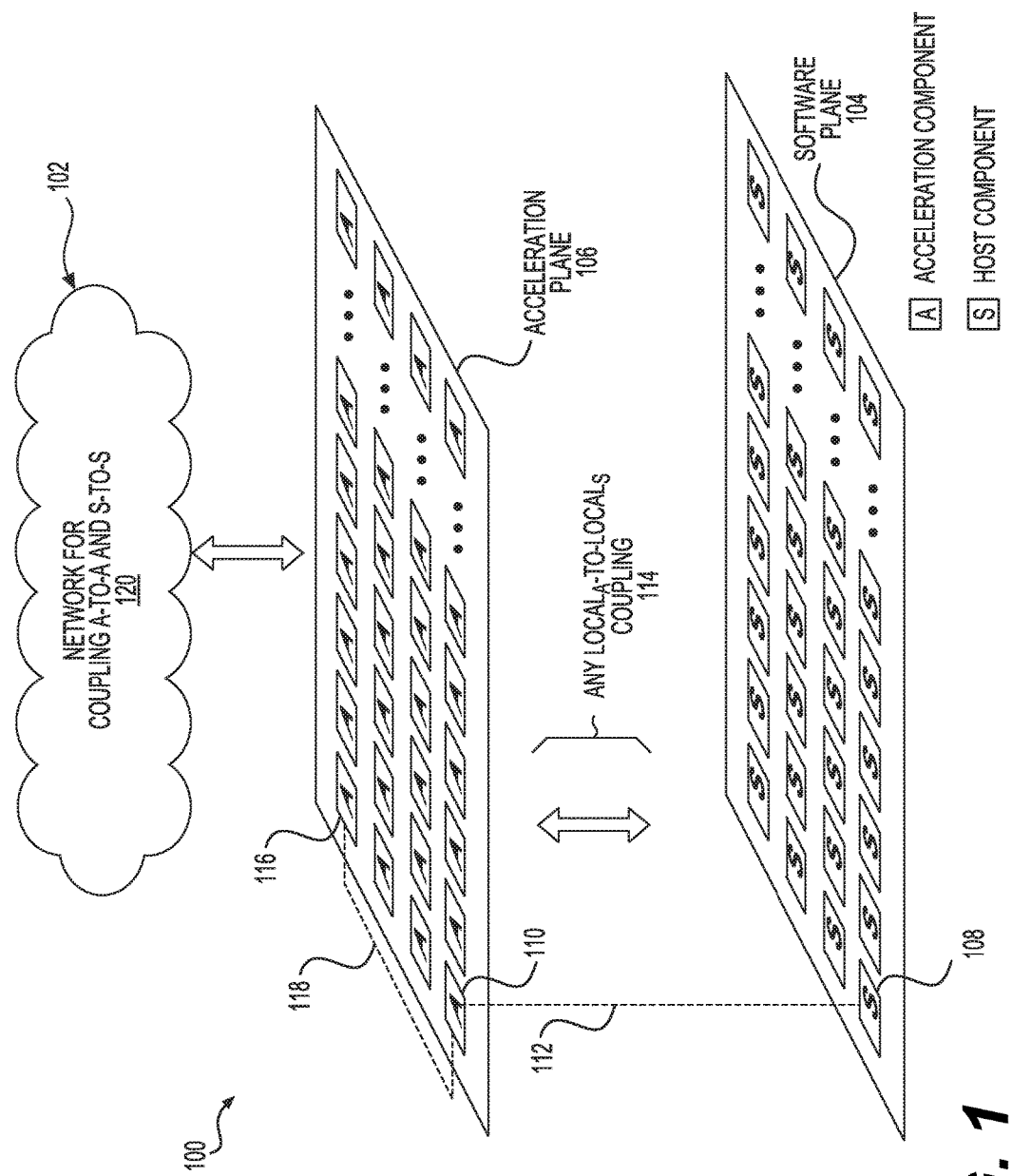
FIG. 1 is a diagram of an architecture that may include a software plane and an acceleration plane in accordance with one example.

Examples described in this disclosure relate to methods and systems that provide for flow control and congestion management of messages among acceleration components configurable to accelerate a service. Certain aspects of the present disclosure relate to adjusting the flow rate between communicating endpoints, such as acceleration components. Certain aspects of the present disclosure further relate to sender-coordinated congestion control when multiple sending endpoints are sending traffic or attempting to send traffic to the same receiving endpoint. An acceleration component includes, but is not limited to, a hardware component configurable (or configured) to perform a function corresponding to a service being offered by, for example, a data center more efficiently than software running on a general-purpose central processing unit (CPU). Acceleration components may include Field Programmable Gate Arrays (FPGAs), Graphics Processing Units (GPUs), Application Specific Integrated Circuits (ASICs), Erasable and/or Complex programmable logic devices (PLDs), Programmable Array Logic (PAL) devices, Generic Array Logic (GAL) devices, and massively parallel processor array (MPPA) devices. An image file may be used to configure or re-configure acceleration components such as FPGAs. Information included in an image file can be used to program hardware components of an acceleration component (e.g., logic blocks and reconfigurable interconnects of an FPGA) to implement desired functionality. Desired functionality can be implemented to support any service that can be offered via a combination of computing, networking, and storage resources such as via a data center or other infrastructure for delivering a service.

The described aspects can also be implemented in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

A data center deployment may include a hardware acceleration plane and a software plane. The hardware acceleration plane can include a plurality of networked acceleration components (e.g., FPGAs). The software plane can include a plurality of networked software implemented host components (e.g., central processing units (CPUs)). A network infrastructure can be shared between the hardware acceleration plane and the software plane. In some environments, software-implemented host components are locally linked to corresponding acceleration components. Acceleration components may communicate with each other via a network protocol. To provide reliable service to a user of the service being offered via a data center, any communication mechanisms may be required to meet certain performance requirements, including reliability. In certain examples, the present disclosure provides for a lightweight transport layer for meeting such requirements. In one example, the acceleration components may communicate with each other via a Lightweight Transport Layer (LTL).

FIG. 1 shows architecture 100 that may include a software plane 104 and an acceleration plane 106 in accordance with one example. The software plane 104 may include a collection of software-driven host components (each denoted by the symbol "S") while the acceleration plane may include a collection of acceleration components (each denoted by the symbol "A"). In this example, each host component may correspond to a server computer that executes machine-readable instruction using one or more central processing units (CPUs). In one example, these instructions may correspond to a service, such as a text/image/video search service, a translation service, or any other service that may be configured to provide a user of a device a useful result. Each CPU may execute the instructions corresponding to the various components (e.g., software modules or libraries) of the service. Each acceleration component may include hardware logic for implementing functions, such as, for example, portions of services offered by a data center.

Acceleration plane 106 may be constructed using a heterogenous or a homogenous collection of acceleration components, including different types of acceleration components and/or the same type of acceleration components with different capabilities. For example, acceleration plane 106 may include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), other types of programmable hardware logic devices and so on. Acceleration plane 106 may provide a reconfigurable fabric of acceleration components.

A host component may generally be any compute component that may perform operations by using each of its CPU hardware threads to execute machine-readable instructions. An acceleration component may perform operations using several parallel logic elements to perform computational tasks. As an example, an FPGA may include several gate arrays that may be configured to perform certain computational tasks in parallel. Thus, an acceleration component can perform some operations in less time compared to a software-driven host component. In the context of the architecture 100, the "acceleration" reflects its potential for accelerating the functions that are performed by the host components.

In one example, architecture 100 may correspond to a data center environment that includes a large number of servers. The servers may correspond to the host components in software plane 104. In another example, architecture 100 may correspond to an enterprise system. In a further example, architecture 100 may correspond to a user device or appliance which uses at least one host component that has access to two or more acceleration components. Indeed, depending upon the requirements of a service other implementations for architecture 100 are also possible.

Network 120 may couple host components in software plane 104 to the other host components and couple acceleration components in acceleration plane 106 to other acceleration components. In this example, host components can use network 120 to interact with one another and acceleration components can use network 120 to interact with one another. Interaction among host components in software plane 104 may be independent of the interaction among acceleration components in acceleration plane 106. In this example, two or more acceleration components may communicate in a transparent manner relative to host components in software plane 104, outside the direction of the host components, and without the host components being "aware" of a particular interaction even taking place in acceleration plane 106.

Architecture 100 may use any of a variety of different protocols to facilitate communication among acceleration components over network 120 and can use any of a variety of different protocols to facilitate communication between host components over network 120. For example, architecture 100 can use Ethernet protocol to transmit Internet Protocol (IP) packets over network 120. In one implementation, each local host component in a server is given a single physical IP address. The local acceleration component in the same server may adopt the same IP address. The server can determine whether an incoming packet is destined for the local host component or destined for the local acceleration component in different ways. For example, packets that are destined for the local acceleration component can be formulated as UDP packets having a specific port; host-defined packets, on the other hand, may not be formulated in this way. In another example, packets belonging to acceleration plane 106 can be distinguished from packets belonging to software plane 104 based on the value of a status flag in each of the packets. In one example, architecture 100 can be viewed as two logical networks (software plane 104 and acceleration plane 106) that may share the same physical network communication links. Packets associated with the two logical networks may be distinguished from each other by their respective traffic classes.

In another aspect, each host component in the architecture 100 is coupled to at least one acceleration component in acceleration plane 104 through a local link. For example, a host component and acceleration component can be arranged together and maintained as a single serviceable unit (e.g., a server) within architecture 100. In this arrangement, the server can be referred to as the "local" host component to distinguish it from other host components that are associated with other servers. Similarly, acceleration component(s) of a server can be referred to as the "local" acceleration component(s) to distinguish them from other acceleration components that are associated with other servers.

As depicted in architecture 100, host component 108 may be coupled to acceleration component 110 through local link 112 (e.g., a Peripheral Component Interconnect Express (PCIe) link). Thus, host component 108 may be a local host component from the perspective of acceleration component 110 and acceleration component 110 may be a local acceleration component from the perspective of host component 108. The local linking of host component 108 and acceleration component 110 can form part of a server. More generally, host components in software plane 104 can be locally coupled to acceleration components in acceleration plane 106 through many individual links collectively represented as a $local_A$-to-$local_S$ coupling 114. In this example, a host component can interact directly with any locally linked acceleration components. A host component can initiate communication to a locally linked acceleration component to cause further communication among multiple acceleration components. For example, a host component can issue a request for a service (or portion thereof) where functionality for the service *or portion thereof) is composed across a group of one or more acceleration components in acceleration plane 106. A host component can also interact indirectly with other acceleration components in acceleration plane 106 to which the host component is not locally linked. For example, host component 108 can indirectly communicate with acceleration component 116 via acceleration component 110. In this example, acceleration component 110 communicates with acceleration component 116 via via a link 118 of a network (e.g., network 120).

Acceleration components in acceleration plane 106 may advantageously be used to accelerate larger scale services robustly in a data center. Substantial portions of complex datacenter services can be mapped to acceleration components (e.g., FPGAs) by using low latency interconnects for computations spanning multiple acceleration components. Acceleration components can also be reconfigured as appropriate to provide different service functionality at different times. Although FIG. 1 shows a certain number of components of architecture 100 arranged in a certain manner, there could be more or fewer number of components arranged differently. In addition, various components of architecture 100 may be implemented using other technologies as well.

Figure 2:
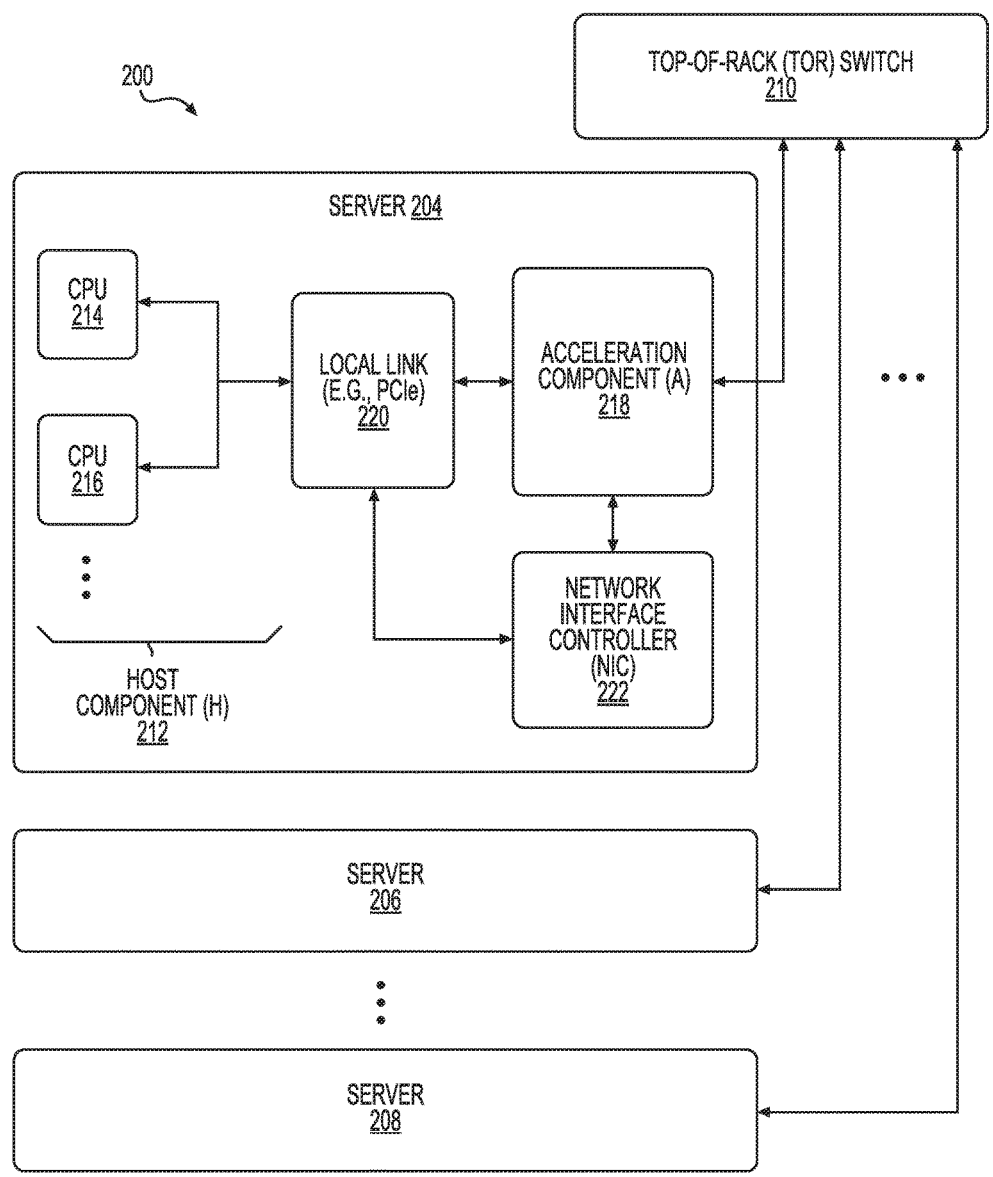
FIG. 2 shows a diagram of a system for transmission of messages by acceleration components configured to accelerate a service in accordance with one example.

FIG. 2 shows a diagram of a system 200 for transmission or retransmission of messages by acceleration components configured to accelerate a service in accordance with one example. In one example, system 200 may be implemented as a rack of servers in a data center. Servers 204, 206, and 208 can be included in a rack in the data center. Each of servers 204, 206, and 208 can be coupled to top-of-rack (TOR) switch 210. Other racks, although not shown, may have a similar configuration. Server 204 may further include host component 212 including CPUs 214, 216, etc. Host component 212 along with host components from servers 206 and 208 can be included in software plane 104. Server 204 may also include acceleration component 218. Acceleration component 218 along with acceleration components from servers 206 and 208 can be included in acceleration plane 106.

Acceleration component 218 may be directly coupled to a host component 212 via local link 220 (e.g., a PCIe link). Thus, acceleration component 218 can view host component 212 as a local host component. Acceleration component 218 and host component 212 may also be indirectly coupled by way of network interface controller 222 (e.g., used to communicate across network infrastructure 120). In this example, server 204 can load images representing service functionality onto acceleration component 218.

Acceleration component 218 may also be coupled to TOR switch 210. Hence, in system 200, acceleration component 218 may represent the path through which host component 212 interacts with other components in the data center (including other host components and other acceleration components). System 200 allows acceleration components 218 to perform processing on packets that are received from (and/or sent to) TOR switch 210 (e.g., by performing encryption, compression, etc.), without burdening the CPU-based operations performed by host component 212. Although FIG. 2 shows a certain number of components of system 200 arranged in a certain manner, there could be more or fewer number of components arranged differently. In addition, various components of system 200 may be implemented using other technologies as well.

Figure 3:
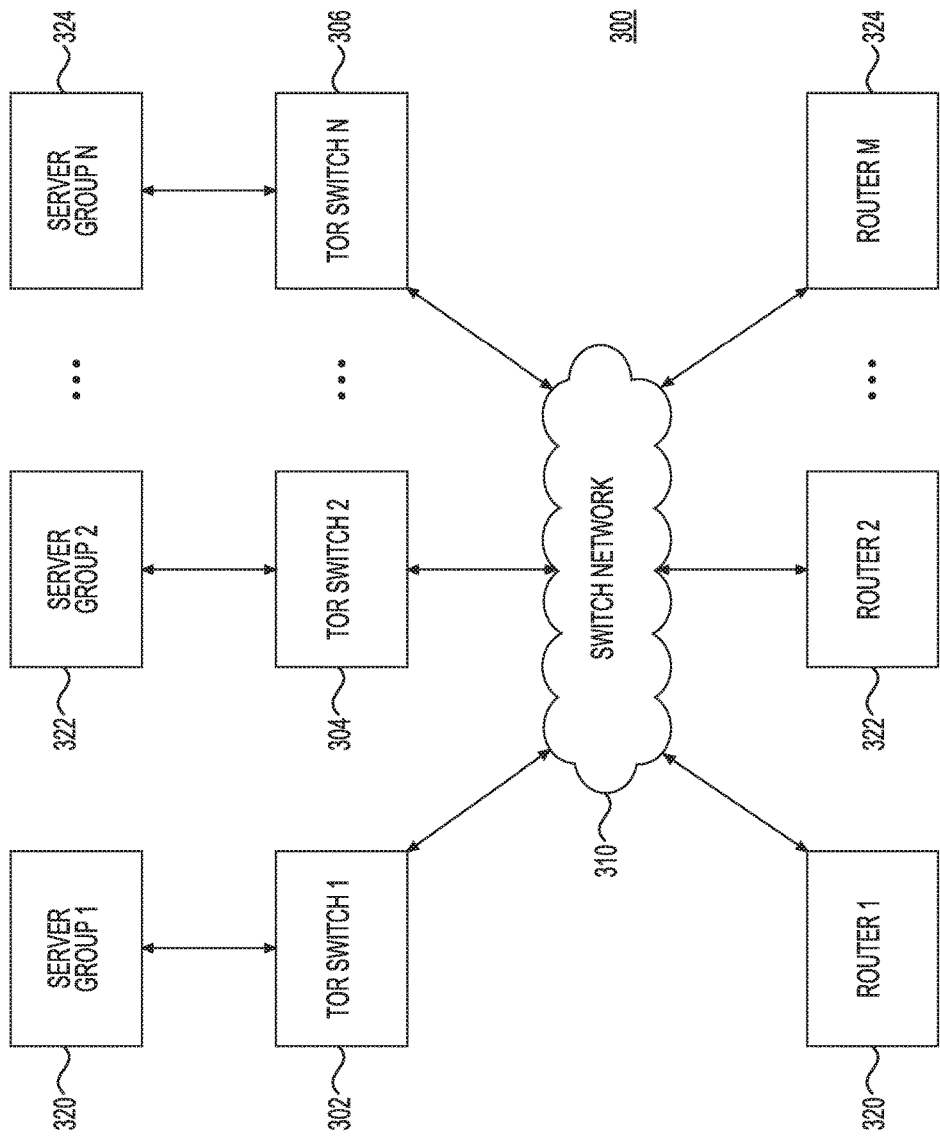
FIG. 3 shows a diagram of a system for transmission of messages by acceleration components configured to accelerate a service in accordance with one example.

FIG. 3 shows a diagram of a system 300 for transmission or retransmission of messages by acceleration components configured to accelerate a service in accordance with one example. In this example, IP routing may be used for transmitting or receiving messages among TOR switches, including TOR Switch 1 302, TOR Switch 2 304, and TOR Switch N 306. Each server or sever group may have a single "physical" IP address that may be provided by the network administrator. Thus, in this example, Server Group 1 320, Server Group 2 322, and Server Group N 324 may each include servers, where each of them may have a "physical" IP address. Acceleration components may use its server's physical IP as its address. To distinguish between IP packets destined for the host from packets destined for an acceleration component, UDP packets, with a specific port to designate the acceleration component as the destination, may be used. An acceleration component may transmit a message to a selected set of acceleration components associated with different TOR switches using Layer 3 functionality corresponding to the seven-layer open-systems interconnection (OSI) model. Layer 3 functionality may be similar to that provided by the network layer of the OSI model. In this example, an acceleration component may transmit a point-to-point message to each of the other relevant acceleration components associated with respective TOR switches. Those acceleration components may then use a Layer 2 Ethernet broadcast packet to send the data to all of the acceleration components associated with the TOR switch. Layer 2 functionality may be similar to that provided by the data-link layer of the OSI model. Layer 2 functionality may include media access control, flow control, and error checking. In one example, this step will not require any broadcasting support from a network interconnecting the acceleration plane and the software plane. This may advantageously alleviate the need for multicasting functionality provided by the routers or other network infrastructure. This, in turn, may reduce the complexity of deploying and managing acceleration components. In addition, in general, the higher levels of the network (e.g., the network including routers and other TOR switches) may be oversubscribed, which, in turn, may lower the bandwidth available to acceleration components communicating using the higher network. In contrast in this example, the acceleration components that share a TOR switch may advantageously have a higher bandwidth available to them for any transmission of messages from one acceleration component to another.

Figure 4:
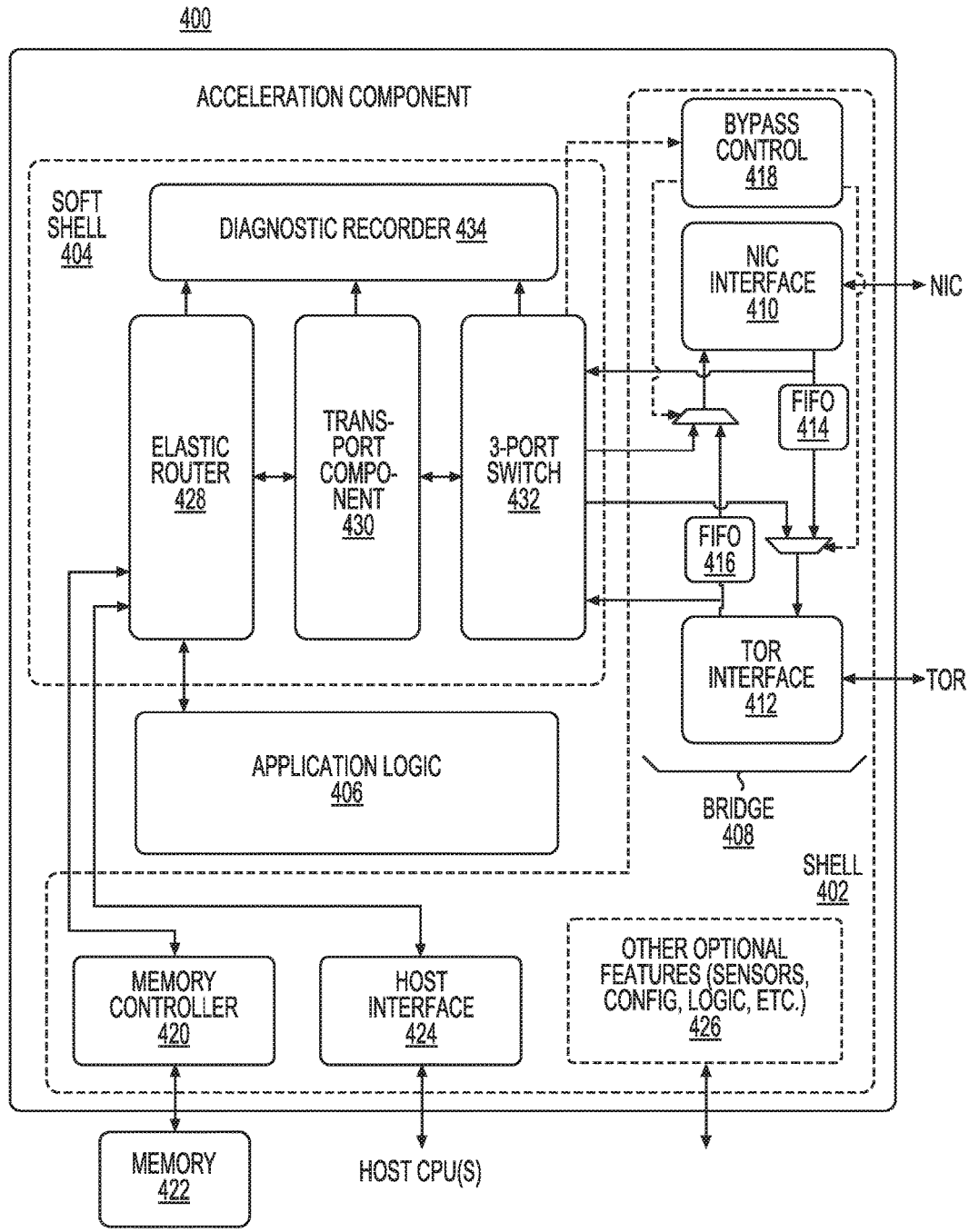
FIG. 4 shows a diagram of an acceleration component in accordance with one example.

FIG. 4 shows a diagram of an acceleration component 400 in accordance with one example. Acceleration component 400 can be included in acceleration plane 106. Components included in acceleration component 400 can be implemented on hardware resources (e.g., logic blocks and programmable interconnects) of acceleration component 400.

Acceleration component 400 may include application logic 406, soft shell 404 associated with a first set of resources and shell 402 associated with a second set of resources. The resources associated with shell 402 may correspond to lower-level interface-related components that may generally remain the same across many different application scenarios. The resources associated with soft shell 404 can remain the same across at least some different application scenarios. The application logic 406 may be further conceptualized as including an application domain (e.g., a "role"). The application domain or role can represent a portion of functionality included in a composed service spread out over a plurality of acceleration components. Roles at each acceleration component in a group of acceleration components may be linked together to create a group that provides the service acceleration for the application domain.

The application domain hosts application logic 406 that performs service specific tasks (such as a portion of functionality for ranking documents, encrypting data, compressing data, facilitating computer vision, facilitating speech translation, machine learning, etc.). Resources associated with soft shell 404 are generally less subject to change compared to the application resources, and the resources associated with shell 402 are less subject to change compared to the resources associated with soft shell 404 (although it is possible to change (reconfigure) any component of acceleration component 400).

In operation, in this example, application logic 406 interacts with the shell resources and soft shell resources in a manner analogous to the way a software-implemented application interacts with its underlying operating system resources. From an application development standpoint, the use of common shell resources and soft shell resources frees a developer from having to recreate these common components for each service.

Referring first to the shell 402, shell resources may include bridge 408 for coupling acceleration component 400 to the network interface controller (via an NIC interface 410) and a local top-of-rack switch (via a TOR interface 412). Bridge 408 also includes a data path that allows traffic from the NIC or TOR to flow into acceleration component 400, and traffic from the acceleration component 400 to flow out to the NIC or TOR. Internally, bridge 408 may be composed of various FIFOs (414, 416) which buffer received packets, and various selectors and arbitration logic which route packets to their desired destinations. A bypass control component 418, when activated, can control bridge 408 so that packets are transmitted between the NIC and TOR without further processing by the acceleration component 400.

Memory controller 420 governs interaction between the acceleration component 400 and local memory 422 (such as DRAM memory). The memory controller 420 may perform error correction as part of its services.

Host interface 424 may provide functionality that enables acceleration component 400 to interact with a local host component (not shown). In one implementation, the host interface 424 may use Peripheral Component Interconnect Express (PCIe), in conjunction with direct memory access (DMA), to exchange information with the local host component. The outer shell may also include various other features 426, such as clock signal generators, status LEDs, error correction functionality, and so on.

Elastic router 428 may be used for routing messages between various internal components of the acceleration component 400, and between the acceleration component and external entities (e.g., via a transport component 430). Each such endpoint may be associated with a respective port. For example, elastic router 428 is coupled to memory controller 420, host interface 424, application logic 406, and transport component 430.

Transport component 430 may formulate packets for transmission to remote entities (such as other acceleration components), and receive packets from the remote entities (such as other acceleration components). In this example, a 3-port switch 432, when activated, takes over the function of the bridge 408 by routing packets between the NIC and TOR, and between the NIC or TOR and a local port associated with the acceleration component 400.

Diagnostic recorder 434 may store information regarding operations performed by the router 428, transport component 430, and 3-port switch 432 in a circular buffer. For example, the information may include data about a packet's origin and destination IP addresses, host-specific data, or timestamps. The log may be stored as part of a telemetry system (not shown) such that a technician may study the log to diagnose causes of failure or sub-optimal performance in the acceleration component 400.

A plurality of acceleration components like acceleration component 400 can be included in acceleration plane 106. Acceleration components can use different network topologies (instead of using network 120 for communication) to communicate with one another. In one aspect, acceleration components are connected directly to one another, such as, for example, in a two-dimensional torus. Although FIG. 4 shows a certain number of components of acceleration component 400 arranged in a certain manner, there could be more or fewer number of components arranged differently. In addition, various components of acceleration component 400 may be implemented using other technologies as well.

Figure 5:
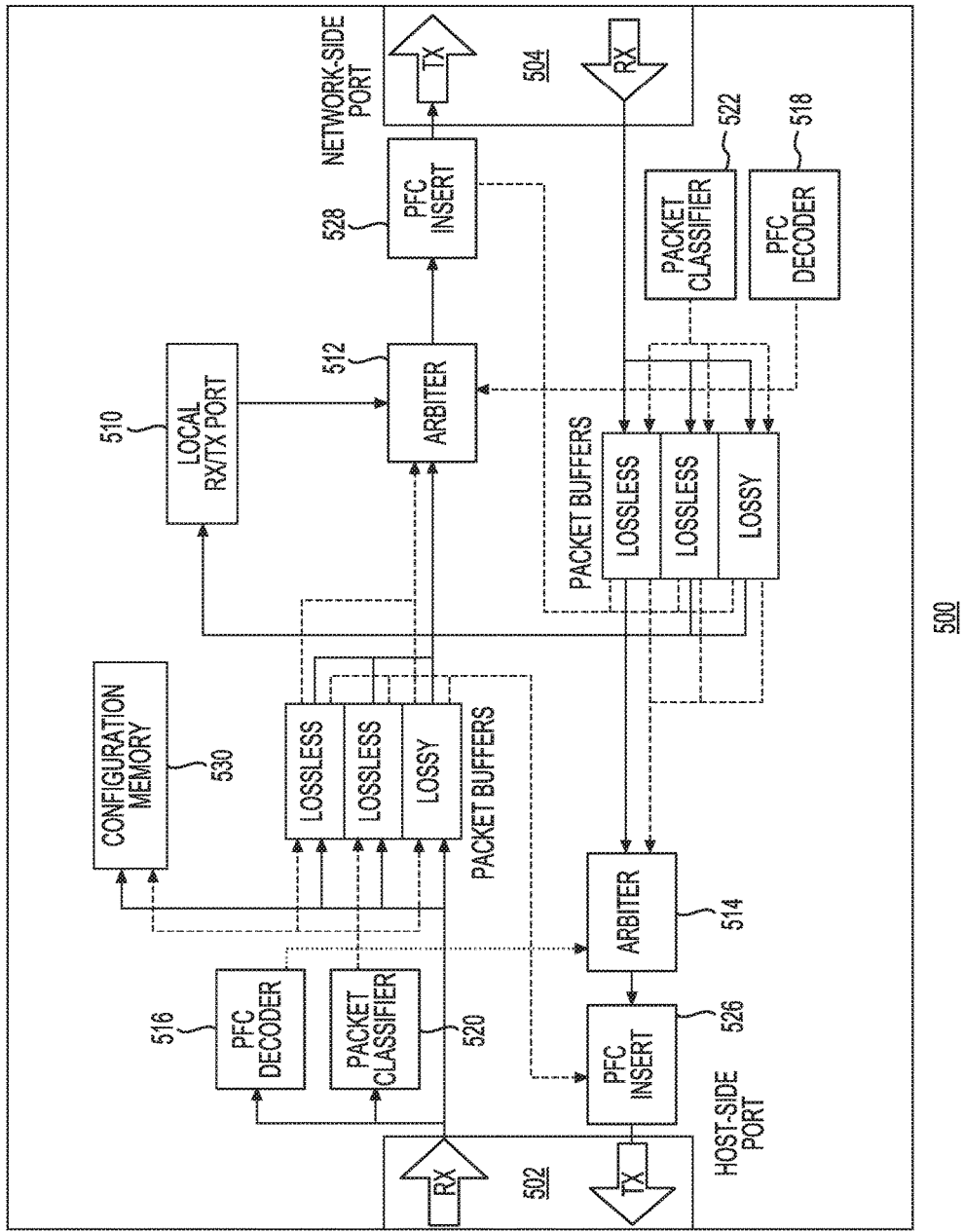
FIG. 5 shows a diagram of a 3-port switch in accordance with one example.

FIG. 5 shows a diagram of a 3-port switch 500 in accordance with one example (solid lines represent data paths, and dashed lines represent control signals). 3-port switch 500 may provide features to prevent packets for acceleration components from being sent on to the host system. If the data network supports several lossless classes of traffic, 3-port switch 500 can be configured to provide sufficient support to buffer and pause incoming lossless flows to allow it to insert its own traffic into the network. To support that, 3-port switch 500 can be configured to distinguish lossless traffic classes (e.g., Remote Direct Memory Access (RDMA)) from lossy (e.g., TCP/IP) classes of flows. A field in a packet header can be used to identify which traffic class the packet belongs to. Configuration memory 530 may be used to store any configuration files or data structures corresponding to 3-port switch 500.

3-port switch 500 may have a first port 502 (host-side) to connect to a first MAC and a second port 504 (network-side) to connect to a second MAC. A third local port may provide internal service to a transport component (e.g., transport component 430). 3-port switch 500 may generally operate as a network switch, with some limitations. Specifically, 3-port switch 500 may be configured to pass packets received on the local port (e.g., Lightweight Transport Layer (LTL) packets) only to the second port 504 (not the first port 502). Similarly, 3-port switch 500 may be designed to not deliver packets from the first port 502 to the local port.

3-port switch 500 may have two packet buffers: one for the receiving (Rx) first port 502 and one for the receiving second port 504. The packet buffers may be split into several regions. Each region may correspond to a packet traffic class. As packets arrive and are extracted from their frames (e.g., Ethernet frames), they may be classified by packet classifiers (e.g., packet classifier 520 and packet classifier 522) into one of the available packet classes (lossy, lossless, etc.) and written into a corresponding packet buffer. If no buffer space is available for an inbound packet, then the packet may be dropped. Once a packet is stored and ready to transmit, an arbiter (e.g., arbiter 512 or arbiter 514) may select from among the available packets and may transmit the packet. A priority flow control (PFC) insertion block (e.g. PFC insert 526 or PFC insert 528) may allow 3-port switch 500 to insert PFC frames between flow packets at the transmit half of either of the ports 502, 504.

3-port switch 500 can handle a lossless traffic class as follows. All packets arriving on the receiving half of the first port 502 and on the receiving half of the second port 504 should eventually be transmitted on the corresponding transmit (Tx) halves of the ports. Packets may be store-and-forward routed. Priority flow control (PFC) can be implemented to avoid packet loss. For lossless traffic classes, 3-port switch 500 may generate PFC messages and send them on the transmit parts of the first and second ports 502 and 504. In one embodiment, PFC messages are sent when a packet buffer fills up. When a buffer is full or about to be full, a PFC message is sent to the link partner requesting that traffic of that class be paused. PFC messages can also be received and acted on. If a PFC control frame is received for a lossless traffic class on the receive part of either the first or second port (502 or 504), 3-port switch 500 may suspend sending packets on the transmit part of the port that received the control frame. Packets may buffer internally until the buffers are full, at which point a PFC frame will be generated to the link partner.

3-port switch 500 can handle a lossy traffic class as follows. Lossy traffic (everything not classified as lossless) may be forwarded on a best-effort basis. 3-port switch 500 may be free to drop packets if congestion is encountered.

Signs of congestion can be detected in packets or flows before the packets traverse a host and its network stack. For example, if a congestion marker is detected in a packet on its way to the host, the transport component can quickly stop or start the flow, increase, or decrease available bandwidth, throttle other flows/connections, etc., before effects of congestion start to manifest at the host.

Figure 6:
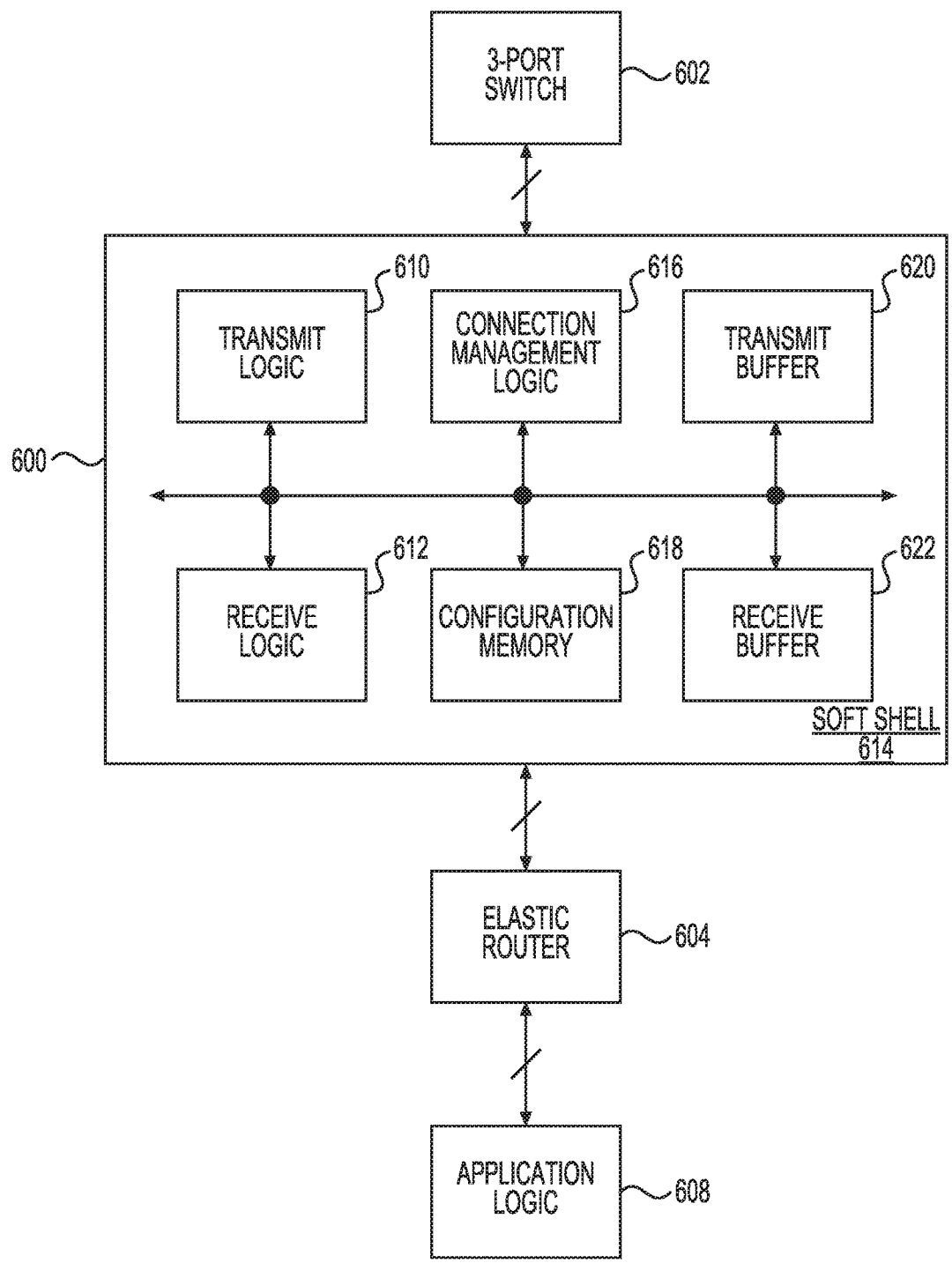
FIG. 6 shows a diagram of a system for transmission of messages by an acceleration component configured to accelerate a service in accordance with one example.

FIG. 6 shows a transport component 600 (an example corresponding to transport component 430 of FIG. 4) coupled to a 3-port switch 602 (an example corresponding to 3-port 432 of FIG. 4) and an elastic router 604 in accordance with one example. Transport component 600 may be configured to act as an autonomous node on a network. In one embodiment, transport component 600 may be configured within an environment or a shell within which arbitrary processes or execution units can be instantiated. The use of transport component 600 may be advantageous because of the proximity between the application logic and the network, and the removal of host-based burdens such as navigating a complex network stack, interrupt handling, and resource sharing. Thus, applications or services using acceleration components with transport components, such as transport component 600, may be able to communicate with lower latencies and higher throughputs. Transport component 600 may itself be an agent that generates and consumes network traffic for its own purposes.

Transport component 600 may be used to implement functionality associated with the mechanism or protocol for exchanging data, including transmitting or retransmitting messages. In this example, transport component 600 may include transmit logic 610, receive logic 612, soft shell 614, connection management logic 616, configuration memory 618, transmit buffer 620, and receive buffer 622. These elements may operate to provide efficient and reliable communication among transport components that may be included as part of the acceleration components.

In one example, transport component 600 may be used to implement the functionality associated with the Lightweight Transport Layer (LTL). Consistent with this example of the LTL, transport component 600 may expose two main interfaces for the LTL: one for communication with 3-port switch 602 (e.g., a local network interface that may then connect to a network switch, such as a TOR switch) and the other for communication with elastic router 604 (e.g., an elastic router interface). In this example, the local network interface (local_*) may contain a NeworkStream, Ready, and Valid for both Rx and Tx directions. In this example, the elastic router interface (router_*) may expose a FIFO-like interface supporting multiple virtual channels and a credit-based flow control scheme. Transport component 600 may be configured via a configuration data structure (struct) for runtime controllable parameters, and may output a status data structure (struct for status monitoring by a host or other soft-shell logic). Table 1 below shows an example of the LTL top-level module interface.

```
module LTL_Base
(
    input                      core_clk,
    input                      core_reset,
    input LTLConfiguration     cfg,
    output LTLStatus           status,
    output NetworkStream       local_tx_out,
    output logic               local_tx_empty_out,
    input                      local_tx_rden_in,
    input NetworkStream        local_rx_in,
    input                      local_rx_wren_in,
    output logic               local_rx_full_out,
    input RouterInterface      router_in,
    input                      router_valid_in,
    output RouterInterface     router_out,
    output                     router_valid_out,
    output RouterCredit        router_credit_out,
    input                      router_credit_ack_in,
    input RouterCredit         router_credit_in,
    input                      router_credit_ack_out,
    input LTLRegAccess         register_wrdata_in,
    input                      register_write_in,
    output logic               LTL_event_valid_out,
    output LTLEventQueueEntry  LTL_event_data_out
);
```

Table 2 below shows example static parameters that may be set for an LTL instance at compile time. The values for these parameters are merely examples and additional or fewer parameters may be specified.

| Parameter Name | Configured Value |
|---|---|
| MAX_VIRTUAL_CHANNELS | 8 |
| ER_PHITS_PER_FLIT | 4 |
| MAX_ER_CREDITS | 256 |
| EXTRA_SFQ_ENTRIES | 32 |

Thus, as noted above in Table 3, this will configure MAX_VIRTUAL_CHANNELS+EXTRA_SFQ_ENTRIES MTU sized buffers for the LTL instance. Elastic router credits (ER_CREDITS) may be issued with a guarantee of at least 1 credit for each virtual channel (VC), and a dynamically calculated number of extra credits. Transport component 600 may expose a configuration input port which sets a number of run-time values. This configuration port may be defined as part of the LTLConfiguration struct data structure. The fields for an example data structure are enumerated in the following table (Table 4):

| Field Name | Example description |
|---|---|
| Src_IP | IPv4 Source Address. |
| Src_MAC | Ethernet MAC address used as the source of all LTL generated messages. |
| Src_port | The UDP source port used in all LTL messages. |
| Dst_port | The UDP destination port for all LTL messages. |
| DSCP | The DSCP value set in IPv4 header of LTL messages-controls which Traffic Class (TC) LTL packets are routed in the datacenter. |
| Throttle_credits_per_scrub | Number of cycles to reduce the per-flow inter_packet gap by on each scrub of the connection table. This may effectively provide a measure of bandwidth to return to each flow per time-period. This may be used as part of congestion management. |
| Throttle_scrub_delay | Cycles to delay starting the next credit scrubbing process. |
| Timeout_Period | Number of time-period counts to wait before timing out an unacknowledged packet and resending it. |
| Disable_timeouts | When set to 1, flows may never "give up"; in other words, unacknowledged packets will be resent continually. |
| Throttle_min | Minimum value of throttling IPG. |
| Throttle_max | Maximum value of throttling IPG. |
| Throttle_credit_multiple | Amount by which throttling IPG is multiplied on Timeouts, NACKs, and congestion events. This multiplier may also be used for decreasing/increasing the per-flow inter-packet gap when exponential backout/comeback is used (see, for example, throttle_linear_backoff and throttle_exponential_comeback). |
| Disable_timeouts | Disable timeout retries. |
| Disable_timeout_drops | Disable timeout drops that happen after 128 timeout retries. |
| Xoff_period | Controls how long of a pause to insert before attempting to send subsequent messages when a remote receiver is receiving XOFF NACKs indicating that it is currently receiving traffic from multiple senders (e.g., has VC locking enabled). |
| Credit_congest_threshold | When delivering traffic to the ER, if a receiver has fewer than credit_congest_threshold credits, sends a congestion ACK so the sender slows down. |
| throttle_slow_start_ipg | Delays sending of a subsequent message when a remote receiver has indicated that it is receiving traffic from multiple senders (e.g., has VC locking enabled). |

-continued

| Field Name | Example description |
|---|---|
| throttle_linear_backoff | Enables linear comeback (i.e., linear increase of inter-packet gap) instead of multiplicative/exponential. |
| ltl_event_mask_enable | Controls which messages to filter when posting LTL events to the LTL event queue. |
| mid_message_timeout | Controls how long a receiver should wait before draining half-received messages (e.g., when a sender fails mid-message). |

The functionality corresponding to the fields, shown in Table 4, may be combined, or further separated. Certain fields could also be in a memory indexed by an address or a descriptor field in the LTLConfiguration struct data structure. Similarly, a special instruction may provide information related to any one of the fields in Table 4 or it may combine the information from such fields. Other changes could be made to the LTLConfiguration struct data structure and format without departing from the scope of this disclosure.

As part of LTL, in one example, all messages may be encapsulated within IPv4/UDP frames. Table 5 below shows an example packet format for encapsulating messages in such frames. The Group column shows the various groups of fields in the packet structure. The Description column shows the fields corresponding to each group in the packet structure. The Size column shows the size in bits of each field. The Value column provides a value for the field and, as needed, provides example description of the relevant field.

| Group | Description | Value |
|---|---|---|
| Ethernet Header | destination MAC | SendConnections[sCTI].DstMac |
| | source MAC | Cfg.src_mac |
| IPv4 | Version | 0x4 |
| | IHL | 0x5 |
| | DSCP | Cfg.DSCP |
| | ECN | 0b01 |
| | Total Length | Entire packet length in bytes |
| | Identification | 0x0000 |
| | Flags | 0b000 |
| | Fragment Offset | 0 |
| | TTL | 0xFF |
| | Protocol | 0x11 (UDP) |
| | Header Checksum | IPv4 Checksum |
| | Source IP Address | Cfg.SrcIP |
| | Destination IP Address | SendConnections[sCTI].DstIP |
| UDP Header | Source Port | Cfg.SrcPort |
| | Destination Port | Cfg.DestPort |
| | Length | Length of UDP header and data |
| LTL | Flags | Bit 7: Last |
| | | Bit 6: ACK |
| | | Bit 5: Congestion |
| | | Bit 4: NACK |
| | | Bit 3: Broadcast |
| | | Bit 2: Retransmit |
| | | Bits1-0: 0 (Reserved) |
| | CTI | Stores the connection table index the receiving node should look up. (Receive CTI for non-ACKs, and Send CTI for ACKs). |
| | Sequence Number | The sequence number of this packet |
| | Length (bytes) | Length of the data payload in bytes |

The functionality corresponding to the fields, shown in Table 5, may be combined, or further separated. Certain fields could also be in a memory indexed by an address or a descriptor field in the packet. Similarly, a special instruction may provide information related to any one of the fields in Table 5 or it may combine the information from such fields. Other changes could be made to the packet structure and format without departing from the scope of this disclosure.

Connection management logic 616 may provide a register interface to establish connections between transport components. Connection management logic 616 along with software (e.g., a soft shell) may setup the connections before data can be transmitted or received. In one example, there are two connection tables that may control the state of connections, the Send Connection Table (SCT) and the Receive Connection Table (RCT). Each of these tables may be stored as part of configuration memory 618 or some other memory associated with transport component 600. Each entry in the SCT, a Send Connection Table Entry (SCTE), may store the current sequence number of a packet and other connection state used to build packets, such as the destination MAC address. Requests arriving from elastic router 604 may be matched to an SCTE by comparing the destination IP address and the virtual channel fields provided by elastic router 604. At most one connection may target a destination IP address and a VC pair. Thus, the tuple {IP, VC} may be a unique key (in database terms) in the table. It may be possible to have two entries in the table with the same VC—for example, {IP: 10.0.0.1, VC: 0}, and {IP: 10.0.0.2, VC:0}. It may also be possible to have two entries with the same IP address and different VCs: {IP: 10.0.0.1, VC: 0} and {IP: 10.0.0.2, VC: 1}. However, two entries with the same {IP, VC} pair may not be allowed. The number of entries that LTL supports may be configured at compile time.

Elastic router 604 may move data in Flits, which may be 128 B in size (32B×4 cycles). Messages may be composed of multiple flits, de-marked by start and last flags. In one example, once elastic router 604 selects a flow to send from an input port to an output port for a given virtual channel, the entire message must be delivered before another message will start to arrive on the same virtual channel. Connection management logic 616 may need to packetize messages from elastic router 604 into the network's maximum transport unit (MTU) sized pieces. This may be done by buffering data on each virtual channel until one of the following conditions is met: (1) the last flag is seen in a flit and (2) an MTU's worth of data (or appropriately reduced size to fit headers and alignment requirements). In this implementation, the MTU for an LTL payload may be 1408 bytes. Once one of the requirements is met, transport component 600, via transmit logic 610, may attempt to send that packet. Packet destinations may be determined through a combination of which virtual channel the message arrives on at transport component 600 input (from elastic router 604) and a message header that may arrive during the first cycle of the messages from elastic router 604. These two values may be used to index into the Send Connection Table, which may provide the destination IP address and sequence numbers for the connection. In this example, each packet transmitted on a given connection should have a sequence number one greater than the previous packet for that connection. The only exception may be for retransmits, which may see a dropped or unacknowledged packet retransmitted with the same sequence number as it was originally sent with. The first packet sent on a connection may have Sequence Number set to 1. So, as an example, for a collection of flits arriving on various virtual channels (VCs) into transport component 600 from elastic router 604, data may be buffered using buffers (e.g., receive buffer 622) until the end of a message or MTU worth of data has been received and then a packet may be output. So, as an example, if 1500 B is sent from elastic router 604 to at least one LTL instance associated with transport component 600 as a single message (e.g. multiple flits on the same VC with zero or one LAST flags), at least one packet may be generated. In this example, the LTL instance may send messages as soon as it has buffered the data—i.e. it will NOT wait for an ACK of the first message before sending the next. There may be no maximum message size. The LTL instance may just keep chunking up a message into MTU-sized packets and transmit them as soon as an MTU's worth data is ready. Similarly, in this example, there is no "message length" field in the packets anywhere—only a payload size for each packet. Transport component 600 may not have advance knowledge of how much data a message will contain. Preferably, an instance of LTL associated with transport component 600 may deliver arriving flits that match a given SCT entry, in-order, even in the face of drops and timeouts. Flits that match different SCT entries may have no ordering guarantees.

In this example, transport component 600 will output one credit for each virtual channel, and then one credit for each shared buffer. Credits will be returned after each flit, except for when a flit finishes an MTU buffer. This may happen if a last flag is received or when a flit contains the MTUth byte of a message. Credits consumed in this manner may be held by transport component 600 until the packet is acknowledged.

In terms of the reception of the packets by an instance of LTL associated with transport component 600, in one example, packets arriving from the network are matched to an RCT entry (RCTE) through a field in the packet header. Each RCTE stores the last sequence number and which virtual channel (VC) to output packets from transport component 600 to elastic router 604 on. Multiple entries in the RCT can point to the same output virtual channel. The number of entries that LTL supports may be configured at compile time. When packets arrive on the local port from the Network Switch, transport component 600 may determine which entry in the Receive Connection Table (RCT) the packet pairs with. If no matching RCT table exists, the packet may be dropped. Transport component may check that the sequence number matches the expected value from the RCT entry. If the sequence number is greater than the RCT entry, the packet may be dropped. If the sequence number is less than the RCT entry expects, an acknowledgement (ACK) may be generated and the packet may be dropped. If it matches, transport component may grab the virtual channel field of the RCT entry. If the number of available elastic router (ER) credits for that virtual channel is sufficient to cover the packet size, transport component 600 may accept the packet. If there are insufficient credits, transport component 600 may drop the packet. Once the packet is accepted, an acknowledgement (ACK) may be generated and the RCT entry sequence number may be incremented. Elastic router 604 may use the packet header to determine the final endpoint that the message is destined for. Transport component may need sufficient credits to be able to transfer a whole packet's worth of data into elastic router 604 to make forward progress. To help ensure that all VCs can make progress, transport component 600 may require elastic router 604 to provide dedicated credits for each VC to handle at least one MTU of data for each VC. In this example, no shared credits may be assumed.

SCT/RCT entries can be written by software. In one example, software may keep a mirror of the connection setup. To update an SCT or an RCT entry, the user may write to the register_wrdata_in port, which may be hooked to registers in the soft shell or environment corresponding to the application logic. Table 6, below, is an example of the format of a data structure that can be used for updating entries in the SCT or the RCT.

```
typedef struct packed {
    EthMac          MacAddr,
    logic           scte_not_rcte, //1 bit
    LRPCTI          sCTI; //16 bits
    LRPCTI          rCTI; //16 bits
    VC              Virtual Channel; //3 bits
    IPAddress       IPAddr, //32 bits
} LTLRegAccess,
input LTLRegAccess              register_wrdata_in,
input                           register_write_in
```

To write to an SCT entry, one may set scte_not_rcte to 1, set sCTI value to the value of the index for the SCT that is being written to, and then set the other fields of the data structure in Table 6 appropriately. With respect to timing, the value of register_write_in may be toggled high for at least one cycle. rCTI may be set to the remote acceleration component's RCT entry (in this example, rCTI is included in the UDP packets sent to that acceleration component and this is how the correct connection on the other end is looked up). IPAddr may be set to the destination acceleration component's IP address. MacAddr may be set to the MAC address of a host on the same LAN segment as the acceleration component or the MAC address of the router for the remote hosts. VirtualChannel may be set by looking it up from the flit that arrives from elastic router 604. To write to an RCT entry, one may set scte_not_rcte to 0, set rCTI value to the value of the index of the RCT that is being written to, and then set the other fields of the data structure in Table 6 appropriately. rCTI may be set to the sending acceleration component's RCT entry. IPAddr may be set to the sending acceleration component's IP address. MacAddr may be ignored for the purposes of writing to the RCT. VirtualChannel may be set to the channel on which the message will be sent to elastic router 604.

As an example, to establish a one-way link from a node A (e.g., transport component A (10.0.0.1)) to node B (e.g., transport component B (10.0.0.2)), one could: (1) on transport component A create SCTE {sCTI: 1, rCTI: 4, IP: 10.0.0.2, VC: 1, Mac:01-02-03-04-05-06}; and (2) on transport component B create ROTE {rCTI: 4, sCTI: 1, IP: 10.0.0.1, VC: 2}. In this example, this would take messages that arrive from an elastic router on transport component A with DestIP==10.0.0.2 and VC==1 and send them to transport component B in a packet. The packet header will have the rCTI field set to 4 (the rCTI value read from the SCT). Transport component B will access its RCT entry 4, and learn that the message should be output on VC 2. It will also generate an ACK back to transport component A. In this packet, the sCTI field will have the value 1 (populated from the sCTI value read from the RCT).

An instance of LTL associated with transport component 600 may buffer all sent packets until it receives an acknowledgement (ACK) from the receiving acceleration component. If an ACK for a connection doesn't arrive within a configurable timeout period, the packet may be retransmitted. In this example, all unacknowledged packets starting with the oldest will be retransmitted. A drop of a packet belonging to a given SCT may not alter the behavior of any other connections—i.e. packets for other connection may not be retransmitted. Because the LTL instance may require a reliable communication channel and packets can occasionally go missing on the network, in one example, a timeout based retry mechanism may be used.

If a packet does not receive an acknowledgement within a certain time-period, it may be retransmitted. The timeout period may be set via a configuration parameter. Once a timeout occurs, transport component 600 may adjust the congestion inter-packet gap for that flow.

Transport component 600 may also provide congestion control. If an LTL instance transmits data to a receiver incapable of absorbing traffic at full line rate, the congestion control functionality may allow it to gracefully reduce the frequency of packets being sent to the destination node. Each LTL connection may have an associated inter-packet gap state that controls the minimum number of cycles between the transmission of packets in a flow. At the creation of a new connection, the IPG may be set to 1, effectively allowing full use of any available bandwidth. If a timeout, ECN notification, or NACK occurs on a flow, the delay may be multiplied by the cfg.throttle_credit_multiple parameter (see Table 3) or increased by the cfg.throttle_credits_per_scrub parameter (see Table 3; depending on if linear or exponential backoff is selected). Each ACK received may reduce the IPG by the cfg.throttle_credits_per_scrub parameter (see Table 3) or divide it by the cfg.throttle_credit_multiple parameter (see Table 3; depending on if linear or exponential comeback is selected). An LTL instance may not increase a flow's IPG more than once every predetermined time period; for example, not more than every 2 microseconds (in this example, this may be controlled by the cfg.throttle_scrub_delay parameter (see Table 3)).

Consistent with one example of the LTL, transport component 600 may attempt retransmission 128 times. If, after 128 retries, the packet is still not acknowledged, the packet may be discarded and the buffer freed. Unless the disable_timeouts configuration bit is set, transport component 600 may also clear the SCTE for this connection to prevent further messages and packets from being transmitted. In this example, at this point, no data can be exchanged between the link partners since their sequence numbers will be out of sync. The connection would need to be re-established.

When an LTL instance associated with transport component 600 successfully receives a packet, it will generate an acknowledgement (for example, an empty payload packet with the ACK flag bit set). Acknowledgements (ACKs) may include a sequence number that tells the sender the last packet that was successfully received and the SCTI the sender should credit the ACK to (this value may be stored in the ACK-generator's RCT). Per one example of the LTL, the following rules may be used for generating acks: (1) if the RX Sequence Number matches the expected Sequence Number (in RCT), an ACK is generated with the received sequence number; (2) if the RX Sequence Number is less than the expected Sequence Number, the packet is dropped, but an ACK with the highest received Sequence Number is generated (this may cover the case where a packet is sent twice (perhaps due to a timeout) but then received correctly); and (3) if the RX Sequence Number is greater than the expected Sequence Number, the packet is dropped and no ACK is generated.

An instance of an LTL associated with transport component 600 may generate NACKs under certain conditions. These may be packets flagged with both the ACK and NACK flag bits set. A NACK may be a request for the sender to retransmit a particular packet and all subsequent packets.

In one example, under two conditions, transport component 600 may require the generation of a NACK: (1) if a packet is dropped due to insufficient elastic router credits to accept the whole packet, transport component 600 may send a NACK once there are sufficient credits; or (2) if a packet is dropped because another sender currently holds the lock on a destination virtual channel, transport component 600 may send a NACK once the VC lock is released.

When an LTL endpoint is receiving traffic from multiple senders, the receiver may maintain a side data structure per VC (VCLockQueue) that may keep track of which senders had their packets dropped because another message was being received on a specific VC. This side data structure may be used to coordinate multiple senders through explicit retransmit requests (NACKs).

In one example, once an instance of LTL associated with transport component 600 starts receiving a message on a specific VC, that VC is locked to that single sender until all packets of that message have been received. If another sender tries to send a packet on the same VC while it is locked or while there are not enough ER credits available, the packet will get dropped and the receiver will be placed on the VCLockQueue. Once the lock is released or there are enough ER credits, the LTL instance will pop the VCLockQueue and send a retransmit request (NACK) to the next sender that was placed in the VCLockQueue. After being popped from the VCLockQueue, a sender may be given the highest priority for the next 200000 cycles (~1.15 ms). Packets from the other senders on the same VC will be dropped during these 200000 cycles. This may ensure that all senders that had packets dropped will eventually get a chance to send their message.

When a receiver drops a sender's packet because another sender has the VC lock, the receiver may place the sender (that had its packet dropped) on the VCLockQueue and send a NACK that also includes the XOFF flag, indicating that the sender should not try retransmitting for some time (dictated by the cfg.xoff_period parameter). If the receiver was out of ER credits the NACK may also include the Congestion flag.

When a sender receives a NACK with the XOFF flag it may delay the next packet per the back-off period (e.g., the xoff_period). If the NACK does not include the congestion flag (i.e., the drop was not due to insufficient credits but due to VC locking), then the sender may make a note that VC locking is active for that flow. When a flow has VC locking enabled senders may need to make sure to slow down after finishing every message, because they know that packets of subsequent messages will get dropped since they are competing with other senders that will be receiving the VC lock next. However, in this example, senders will need to make sure to send the first packet of a subsequent message before slowing down (even though they know it will be dropped) to make sure that they get placed in the VCLockQueue.

Figure 7:
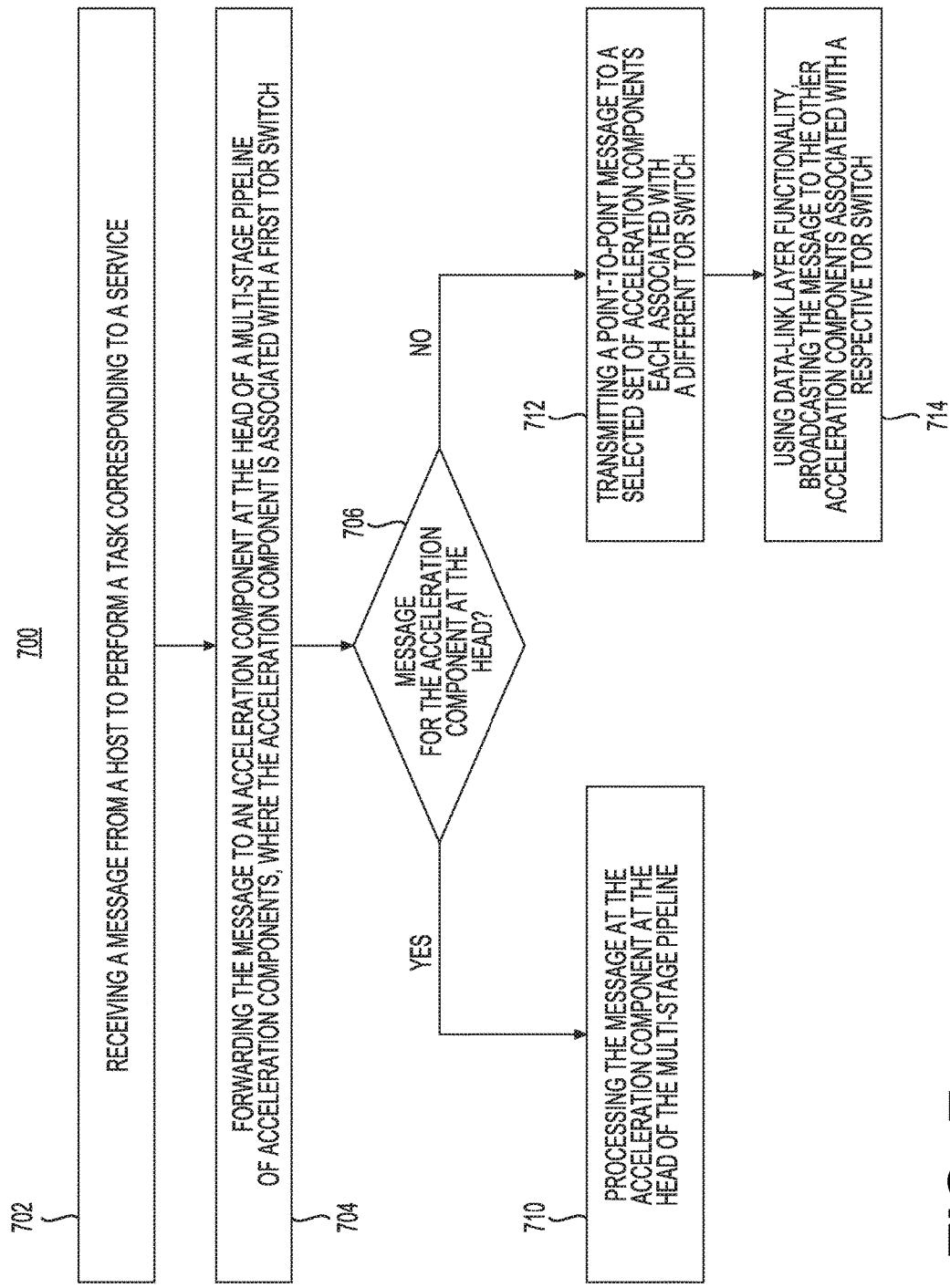
FIG. 7 shows a flow chart of a method for transmission of messages by an acceleration component configured to accelerate a service in accordance with one example.

FIG. 7 shows a flow chart 700 for a method for processing messages using transport components to provide a service in accordance with one example. In one example, the application logic (e.g., application logic 608 of FIG. 6) corresponding to the service, such as a search results ranking service, may be divided up and mapped into multiple accelerator component's roles. As described earlier, the application logic may be conceptualized as including an application domain (e.g., a "role"). The application domain or role can represent a portion of functionality included in a composed service spread out over a plurality of acceleration components. Roles at each acceleration component in a group of acceleration components may be linked together to create a group that provides the service acceleration for the application domain. Each application domain may host application logic to perform service specific tasks (such as a portion of functionality for ranking documents, encrypting data, compressing data, facilitating computer vision, facilitating speech translation, machine learning, etc.). Step 702 may include receiving a message from a host to perform a task corresponding to a service. Step 704 may include forwarding the message to an acceleration component at the head of a multi-stage pipeline of acceleration components, where the acceleration components may be associated with a first switch. Thus, when a request for a function associated with a service, for example, a ranking request arrives from a host in the form of a PCI express message, it may be forwarded to the head of a multi-stage pipeline of acceleration components. In step 706, the acceleration component that received the message may determine whether the message is for the acceleration component at the head. If the message is for the acceleration component at the head of a pipeline stage, then the acceleration component at the head of the pipeline stage may process the message at the acceleration component. As part of this step, an elastic router (e.g., elastic router 604 of FIG. 6) may forward the message directly to the role. In one example, the LTL packet format (e.g., as shown in Table 6) may include a broadcast flag (e.g., Bit 3 under the flags header as shown in Table 6) and a retransmission flag (e.g., Bit 2 under the flags header as shown in Table 6). The broadcast flag may signal to an acceleration component that the message is intended for multiple acceleration components. The retransmission flag may indicate to an acceleration component that retransmission of the message is requested. In both cases, the LTL packet format may include headers that list the IP addresses for the specific destination(s). Thus, when an acceleration component receives a message with the broadcast flag set, in step 712, the acceleration component (e.g., using transport component 600) may transmit the message as a point-to-point message to a selected set of acceleration components, where each of them is associated with a different top-of-rack (TOR) switch. In one example, the point-to-point message is transmitted using a Layer 3 functionality. In this example, when transmit component 600 receives a packet (e.g., a part of the point-to-point message) with the broadcast flag set, it may process the destination list; if it contains more than just its own IP address, it will add the packet to its own transmit buffers, setup a bit-field to track receipt by each of the destinations and then start transmitting to each receiver one by one (without the broadcast or retransmit fields). Destination acceleration components may acknowledge (using ACK) each packet upon successful receipt and the sender will mark the appropriate bit in the bit-field. Once a packet is acknowledged by all destinations, the send buffer can be released.

Next, in step 714, each of the set of acceleration components may, using data-link layer functionality, broadcast that message to any other acceleration components associated with the respective TOR switch. An example of data-link layer functionality may be Layer 2 Ethernet broadcast packets. In one example, when transport component 600 receives a packet (e.g., a part of the point-to-point message) with the broadcast flag set, it may process the destination list; if it contains more than just its own IP address, it will add the packet to its own transmit buffers, setup a bit-field to track receipt by each of the destinations and then send a Layer 2 Ethernet broadcast (with the broadcast flag and the destination list) to all of the acceleration components that share a common TOR switch. Destination acceleration components may acknowledge (using ACK) each packet upon successful receipt and the sender will mark the appropriate bit in the bit-field. Once a packet is acknowledged by all destinations, the send buffer can be released. Although FIG. 7 shows a certain number of steps listed in a certain order, there could be fewer or more steps and such steps could be performed in a different order.

The acceleration components may be grouped together as part of a graph. The grouped acceleration components need not be physically proximate to each other; instead, they could be associated with different parts of the data center and still be grouped together by linking them as part of an acceleration plane. In one example, the graph may have a certain network topology depending upon which of the acceleration components associated with which of the TOR switches are coupled together to accelerate a service. The network topology may be dynamically created based on configuration information received from a service manager for the service. Service manager may be a higher-level software associated with the service. In one example, the network topology may be dynamically adjusted based on at least one performance metric associated with the network (e.g., network 120) interconnecting the acceleration plane and a software plane including host components configured to execute instructions corresponding to the at least one service. Service manager may use a telemetry service to monitor network performance. The network performance metric may be selected substantially, in real time, based on at least on the requirements of the at least one service. The at least one network performance metric may comprise latency, bandwidth, or any other performance metric specified by a service manager or application logic corresponding to the at least one service.

In one example, the acceleration components may broadcast messages using a tree-based transmission process including point-to-point links for acceleration components connected via Layer 3 and Layer 2 Ethernet broadcasts for the acceleration components that share a TOR switch. The tree may be two-level or may have more levels depending upon bandwidth limitations imposed by the network interconnecting the acceleration components.

Figure 8:
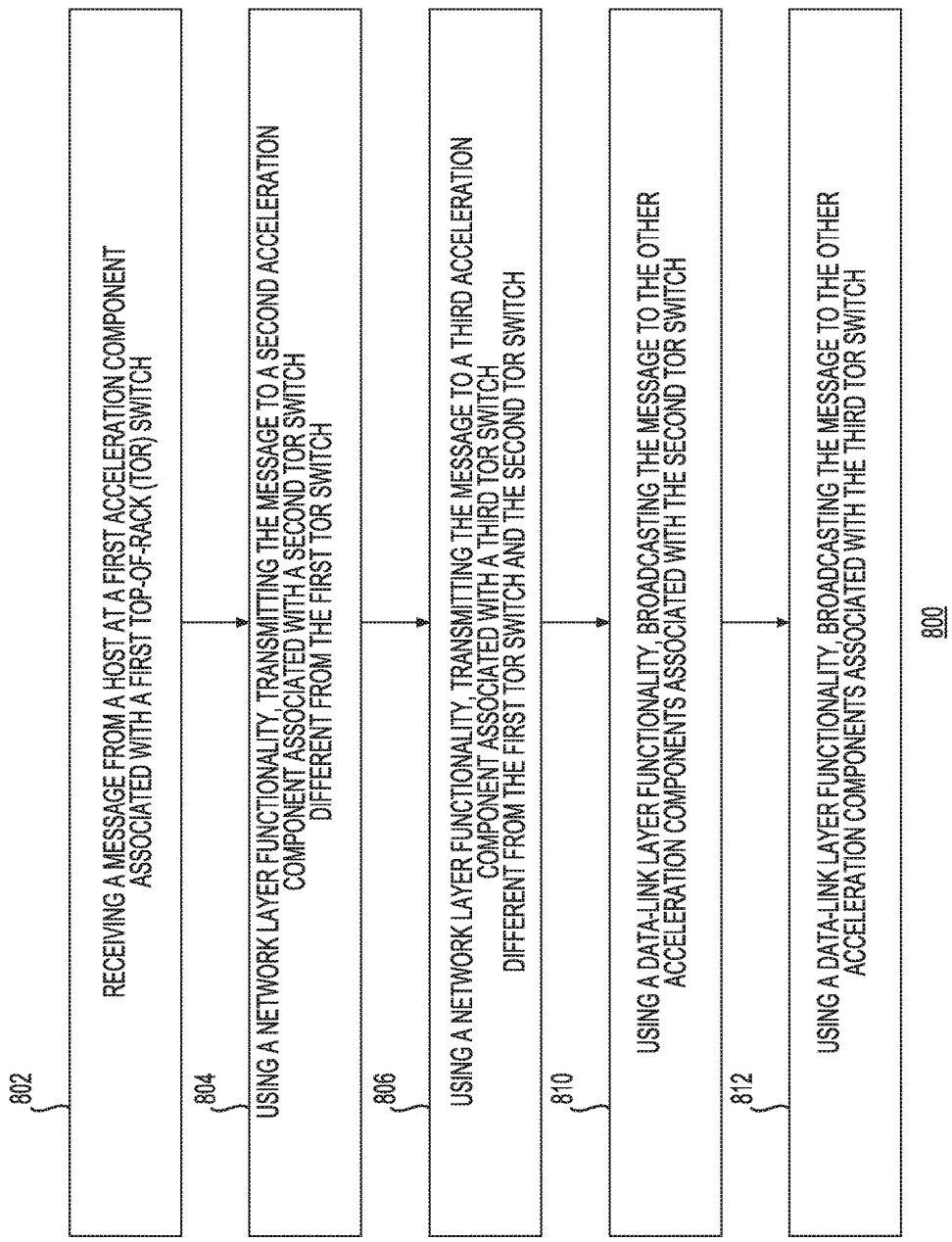
FIG. 8 shows a flow chart of another method for transmission of messages by acceleration components configured to accelerate a service in accordance with one example.

FIG. 8 shows a flow chart for a method for transmitting messages in accordance with one example. In step 802, a first acceleration component, associated with a first TOR switch may receive a message from a host. As discussed earlier, an acceleration component may include a transport component to handle messaging (e.g., transport component of 430 of FIG. 4, which is further described with respect to transport component 600 of FIG. 6). In step 804, using a network layer functionality (e.g., Layer 3 functionality) the first acceleration component may transmit the message to a second acceleration component associated with a second TOR switch, different from the first TOR switch. In step 806, using a network layer functionality (e.g., Layer 3 functionality) the first acceleration component may transmit the message to a third acceleration component associated with a third TOR switch, different from the first TOR switch and the second TOR switch. In this example, when transmit component 600 receives a packet (e.g., a part of the received message) with the broadcast flag set, it may process the destination list; if it contains more than just its own IP address, it will add the packet to its own transmit buffers, setup a bit-field to track receipt by each of the destinations and then start transmitting to each receiver one by one (without the broadcast or retransmit fields). Destination acceleration components may acknowledge (using ACK) each packet upon successful receipt and the sender will mark the appropriate bit in the bit-field. Once a packet is acknowledged by all destinations, the send buffer can be released.

In step 810, the second acceleration component, using a data-link layer functionality (e.g., Layer 2 Ethernet broadcast functionality), may broadcast the message to the other acceleration components associated with the second TOR switch. In this example, when transport component 600 receives a packet (e.g., a part of the point-to-point message) with the broadcast flag set, it may process the destination list; if it contains more than just its own IP address, it will add the packet to its own transmit buffers, setup a bit-field to track receipt by each of the destinations and then send a Layer 2 Ethernet broadcast (with the broadcast flag and the destination list) to all of the acceleration components that share a common TOR switch. Destination acceleration components may acknowledge (using ACK) each packet upon successful receipt and the sender will mark the appropriate bit in the bit-field. Once a packet is acknowledged by all destinations, the send buffer can be released.

In step 810, the third acceleration component, using a data-link layer functionality (e.g., Layer 2 Ethernet broadcast functionality), may broadcast the message to the other acceleration components associated with the third TOR switch. In this example, when transport component 600 receives a packet (e.g., a part of the point-to-point message) with the broadcast flag set, it may process the destination list; if it contains more than just its own IP address, it will add the packet to its own transmit buffers, setup a bit-field to track receipt by each of the destinations and then send a Layer 2 Ethernet broadcast (with the broadcast flag and the destination list) to all of the acceleration components that share a common TOR switch. Destination acceleration components may acknowledge (using ACK) each packet upon successful receipt and the sender will mark the appropriate bit in the bit-field. Once a packet is acknowledged by all destinations, the send buffer can be released. Although FIG. 8 shows a certain number of steps listed in a certain order, there could be fewer or more steps and such steps could be performed in a different order.

Figure 9:
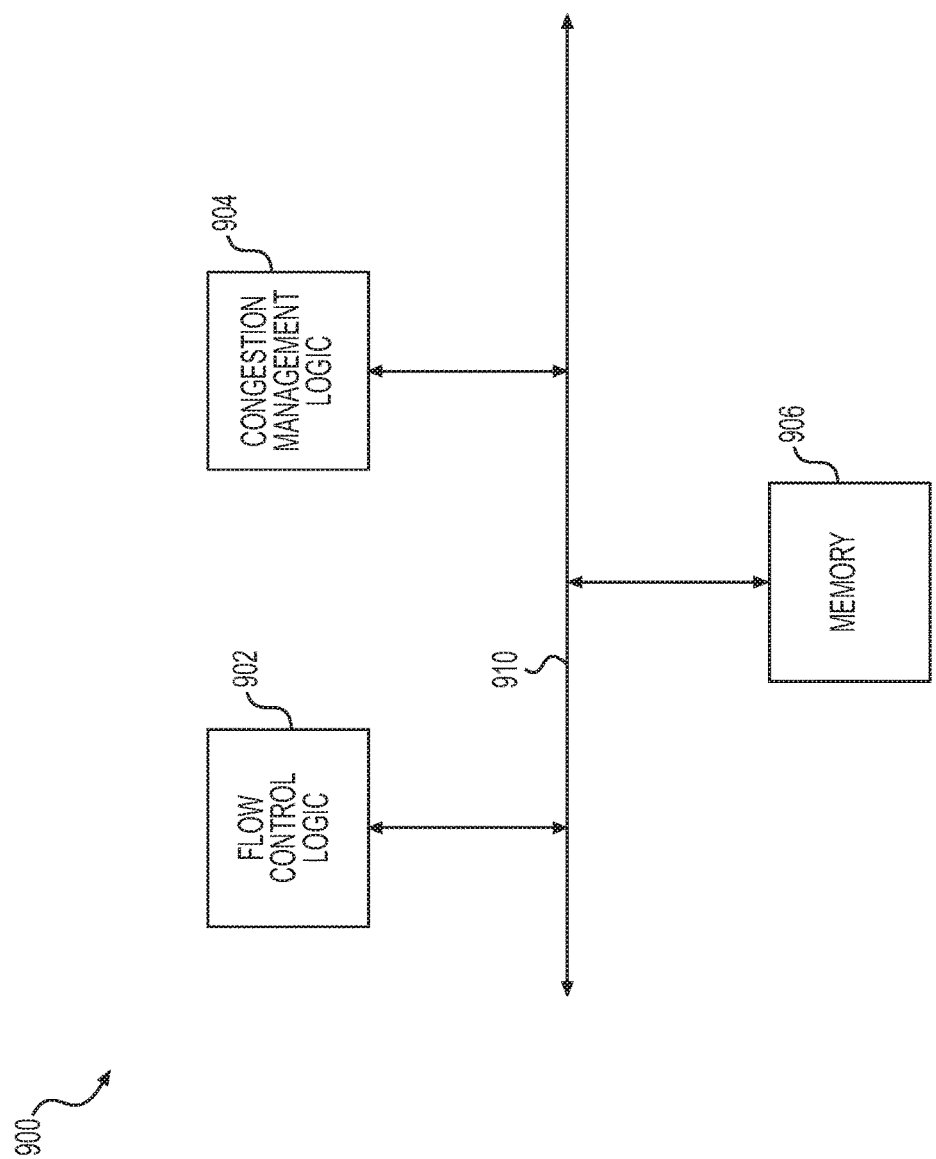
FIG. 9 shows a diagram of additional logic and memory that may be included as part of an acceleration component to provide additional flow control and congestion control in accordance with one example.
Figure 10:
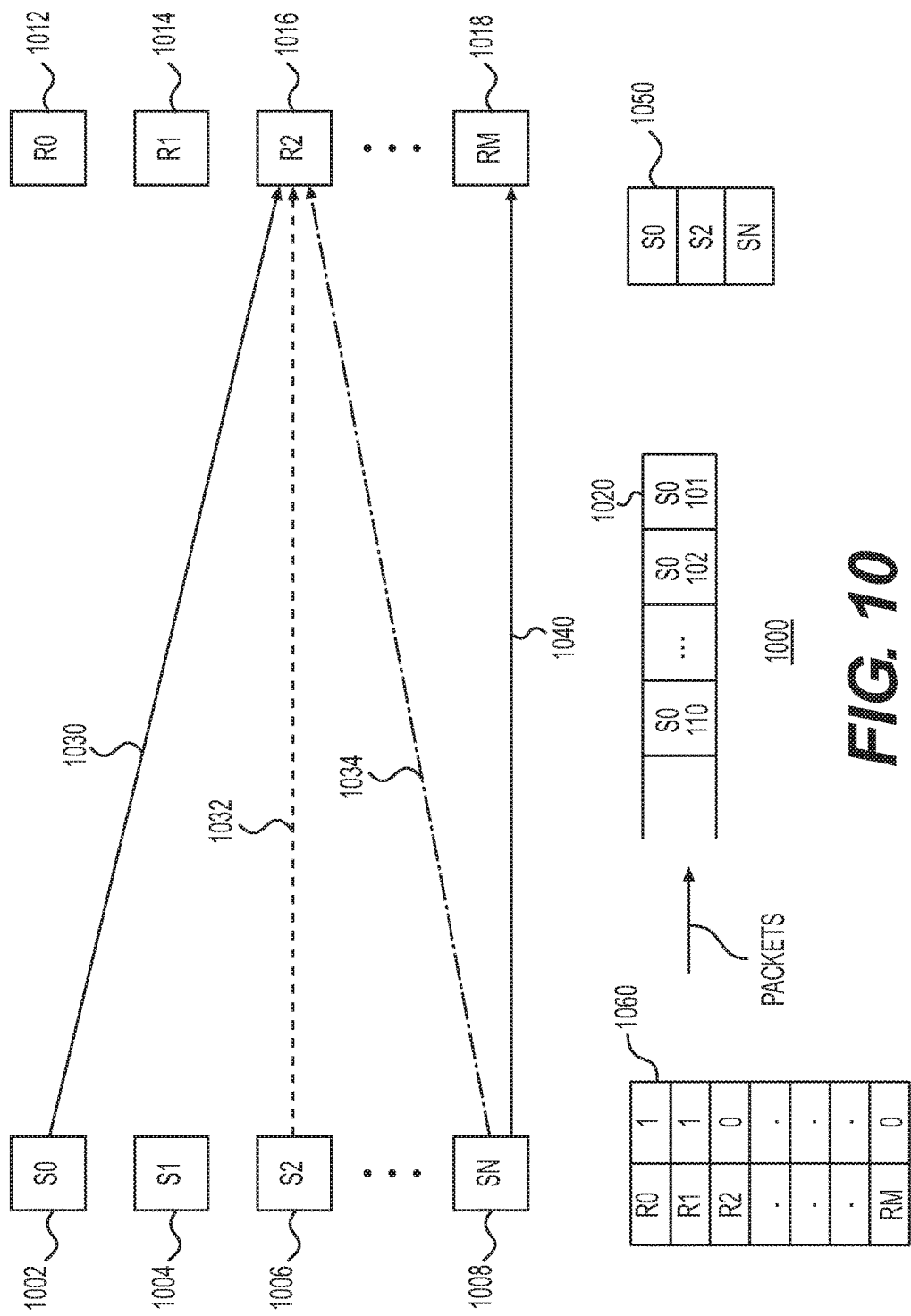
FIG. 10 shows a diagram of communications (and a subset of the structures for enabling such communications) among sending endpoints (e.g., sending acceleration components) and receiving endpoints (e.g., receiving acceleration components) in accordance with one example.

FIG. 9 shows a diagram of additional logic and memory 900 that may be included as part of transport component 600 to provide additional flow control and congestion control. In this example, flow control logic 902, congestion management logic 904, and memory 906, which may communicate via bus 910, may be integrated as part of transport component 600. FIG. 10 shows a diagram 1000 of communications (and a subset of the structures for enabling such communications) among sending endpoints (e.g., sending acceleration components) and receiving endpoints (e.g., receiving acceleration components) in accordance with one example. Any of the sending endpoints S0 1002, S1 1004, S2 1006, and SN 1008 (where N is a positive integer) may communicate with any receiving endpoints R0 1012, R1 1014, R2 1016, and RM 1018 (where M is a positive integer) via a network (e.g., network 120 of FIG. 1 or the network and the components shown in FIG. 3). Each of the endpoints may be configured to operate in at least two modes. One mode may relate to a situation where the flow control and the congestion control pertains to one-to-one communication (e.g., sending endpoint SN transmitting message via a traffic flow 1040 to receiving endpoint RM). The other mode may relate to a situation where multiple sending endpoints are targeting a single receiving endpoint (e.g., sending endpoint S0 1002 transmitting a message to receiving endpoint R2 1016 via a traffic flow 1030, sending endpoint S2 1006 attempting to send a message to receiving endpoint R2 1016 via a traffic flow 1032, and sending endpoint SN 1008 attempting to send a message to receiving endpoint R2 1016 via a traffic flow 1034. Traffic flows 1030, 1032, 1034, and 1040 may relate to traffic among endpoints that share a TOR switch or they may relate to endpoints that do not share TOR switch.

As described earlier with respect to FIG. 3 (for example), endpoints (e.g., acceleration components) may communicate with other endpoints that do not have the same TOR switch via the network components, including switches and/or routers. In the first mode, if an LTL instance transmits data to a receiver incapable of absorbing traffic at full line rate (e.g., gleaned from an indication from the receiver to the sender), flow control logic 902 and/or congestion management logic 904 may allow it to gracefully reduce the frequency of packets being sent to the destination endpoint. Each LTL connection may have an associated inter-packet gap providing the minimum number of cycles between the transmission of packets in a flow. At the creation of a new connection, the IPG may be set to 1, effectively allowing full use of any available bandwidth. If a timeout, an explicit congestion notification (ECN), or an explicit retransmit request (e.g., a NACK) occurs on a flow, the delay may be multiplied by the cfg.throttle_credit_multiple parameter (see Table 3) or increased by the cfg.throttle_credits_per_scrub parameter (see Table 3; depending on if linear or exponential backoff is selected). Each ACK received may reduce the IPG by the cfg.throttle_credits_per_scrub parameter (see Table 3) or divide it by the cfg.throttle_credit_multiple parameter (see Table 3; depending on if linear or exponential comeback is selected). In one example, an LTL instance may not increase a flow's IPG more than once every predetermined time period; for example, not more than every 2 microseconds (in this example, this may be controlled by the cfg.throttle_scrub_delay parameter (see Table 3)).

In the second mode, when an LTL endpoint (e.g., receiving endpoint R2 1016) is receiving traffic from multiple senders (e.g., sending endpoints S0 1002, S2 1006, and SN 1008), the receiver may track senders that might have previously attempted to send at least one message to the receiver and a sender that is currently sending a message to the receiver. In one example, receiving endpoint R2 1016 may maintain a data structure (e.g., queue 1050) that may include an identifier with each of the sending endpoints that might have previously attempted to send at least one message to the receiver and a sender that is currently sending a message to the receiver. In this example, the data structure may be maintained per virtual channel (VC), and may be called a VCLockQueue. In this example, a VC may refer to a flow of packets corresponding to a message from a sender that is targeting a buffer associated with a receiver. In this example, at a time only one sender may target the buffer associated with the receiver. As an example, FIG. 10 shows buffer 1020 associated with a receiver and it is currently receiving packets from sender S0 1002, which have associated sequence numbers (e.g. 101, 102, and 110) and they are being stored in buffer 1020 before being processed by other components. As they get processed, they leave buffer 1020 leaving room for additional packets to be stored there. Other senders may attempt to transmit messages to the receiver, but the receiver is configured to continue to accepts packets from the message that is being currently received and send an indication, such as a NACK to the other senders. Queue 1050 may keep track of which senders had their packets dropped because another message was being received on a specific VC. As an example, queue 1050 includes an identifier for sending endpoint S0 1002 at the head of the queue since this endpoint is currently sending a message to receiving endpoint R2 1016. The next identifier in queue 1050 corresponds to sender S2 1006, which is the next sender in the queue. The next identifier in queue 1050 corresponds to sender SN 1008, which is the next sender in queue 1050.

This data structure may be used to coordinate multiple senders through explicit retransmit requests (NACKs).

In one example, once an instance of LTL associated with transport component 600 starts receiving a message on a specific VC, that VC is locked to that single sender until all packets of that message have been received. If another sender tries to send a packet on the same VC while it is locked or while there are not enough ER credits available, the packet will get dropped and the receiver will be placed on the VCLockQueue. Once the lock is released or there are enough ER credits, the LTL instance will pop the VCLockQueue and send a retransmit request (NACK) to the next sender that was placed in the VCLockQueue. After being popped from the VCLockQueue, a sender may be given the highest priority for the next 200000 cycles (~1.15 ms). Packets from the other senders on the same VC will be dropped during these 200000 cycles. This may ensure that all senders that had packets dropped will eventually get a chance to send their message.

When a receiver drops a sender's packet because another sender has the VC lock, the receiver may place the sender (that had its packet dropped) on the VCLockQueue and send a NACK that also includes the XOFF flag, indicating that the sender should not try retransmitting for some time (dictated by the cfg.xoff_period parameter). If the receiver was out of ER credits the NACK may also include the Congestion flag.

When a sender receives a NACK with the XOFF flag it may delay the next packet per the back-off period (e.g., the xoff_period). If the NACK does not include the congestion flag (e.g., the drop was not due to insufficient credits but due to VC locking), then the sender may make a note that VC locking is active for that flow. When a flow has VC locking enabled senders may need to make sure to slow down after finishing every message, because they know that packets of subsequent messages will get dropped since they are competing with other senders that will be receiving the VC lock next. However, in this example, senders will need to make sure to send the first packet of a subsequent message before slowing down (even though they know it will be dropped) to make sure that they get placed in the VCLockQueue.

Figure 11A:
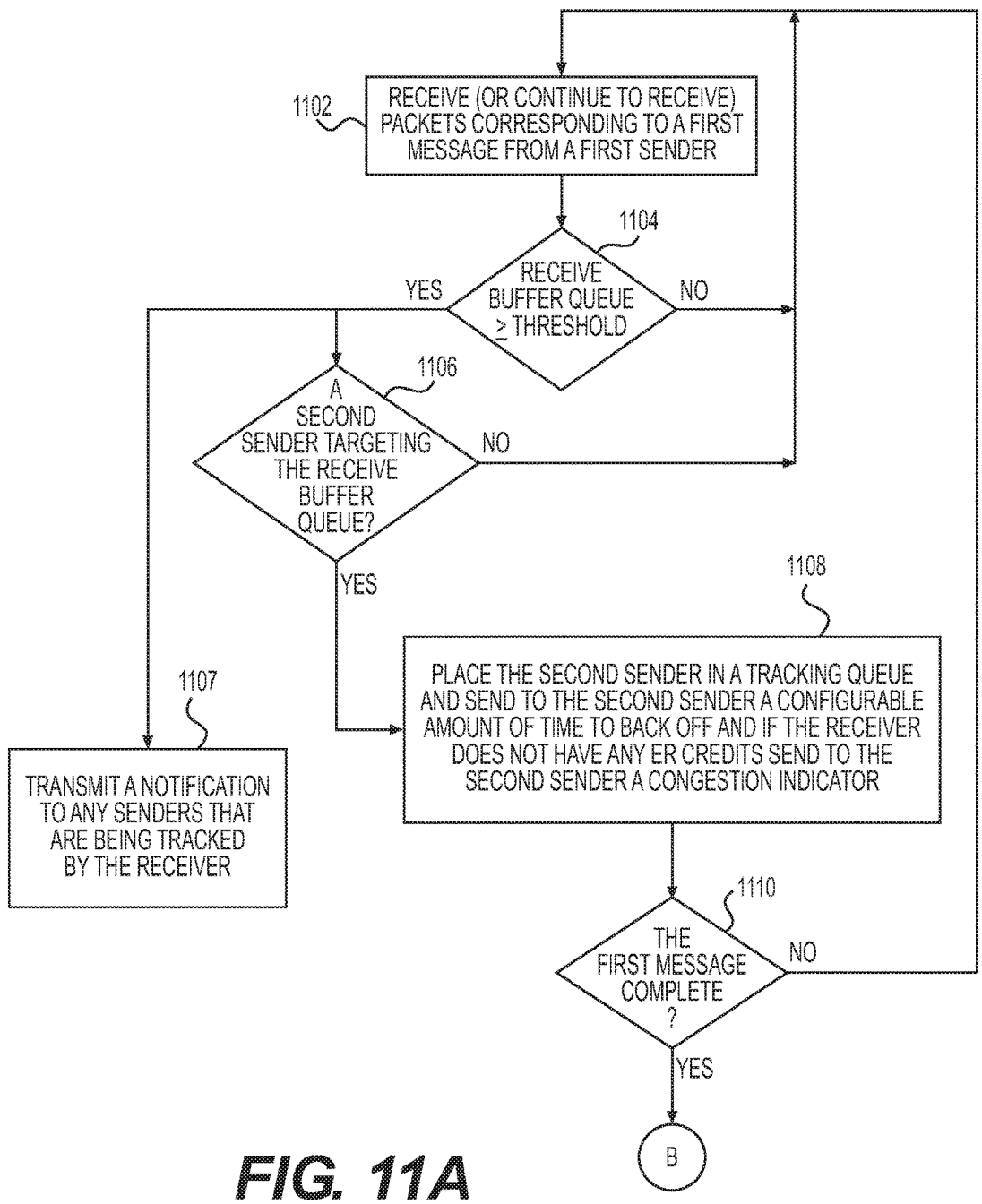
FIGS. 11A and 11 show a flowchart for a method for congestion control and flow control in accordance with one example.
Figure 11:
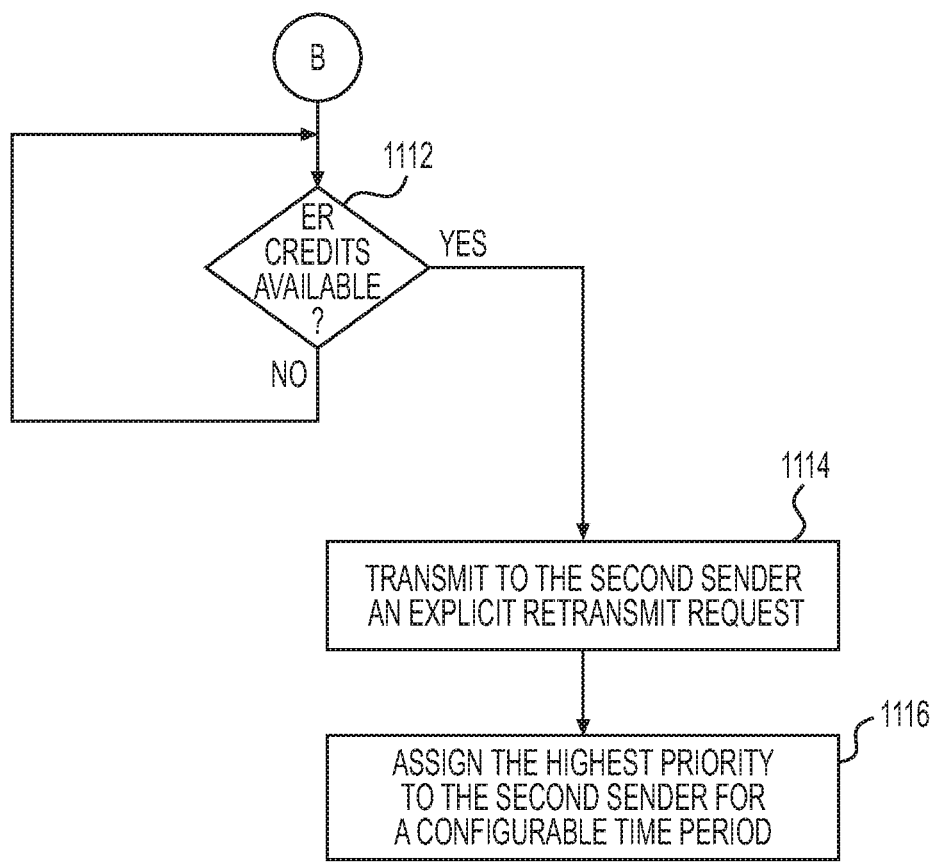

FIGS. 11A and 11 show a flowchart for a method for congestion control and flow control in accordance with one example. In step 1102, a receiver (e.g., any of the receiving endpoints R0 to RM in FIG. 10) may receive (or continue to receive) packets corresponding to a first message from a first sender (e.g., any of the sending endpoints S0 to SN of FIG. 10). In step 1104, flow control logic 902 may determine whether the receiver buffer queue has packets that now exceed or meet a threshold. As part of this step, flow control logic 902 may evaluate different thresholds associated with different senders or different services that the endpoints may be used to accelerate. This way, flow control logic 902 may use multiple bits as part of an indication to the relevant sending endpoints when to slow down and the extent of the slow down. As discussed earlier, the extent of slowdown may be based on the inter-packet gap or an inter-message gap that may be controlled by appropriate flow control logic on the sending endpoint side.

With continued reference to FIG. 11A, in step 1107, the receiver may also transmit a notification to any senders that are being tracked by the receiver. Thus, as part of this step, flow control logic 902 may process queue 1050 to determine which other senders have previously attempted to transmit a message to the same receiver. The notification to the senders may include proactive back-off related information. As an example, the receiver may indicate to the other senders in queue 1050 to not attempt to transmit for a larger back-off time period then a default back-off time period or the reverse. As part of this notification, the receiver may also communicate the back-off method to be used, which could be linear back-off or exponential back-off.

Still referring to FIG. 11 A, in step 1106, flow control logic 902 at the receiver may determine whether a second sender is targeting the receiver's buffer queue. As an example, when flow control logic 902 receives as start of message packet from another sender, then it may conclude at that point that another sender is attempting to transmit a message related to a service to the receiver that is already in the process of receiving a message from a different sender. As explained earlier, in this example, a receiver may receive packets from only one sender at a time and the sender will transmit all packets for the message until the end of message packet is acknowledged as being received. In step 1108, flow control logic 902 may place the second sender in a tracking queue (e.g., queue 1050 of FIG. 10) and send to the second sender a configurable about of back-off time period. At the same time, congestion management logic 904 may determine a status of an elastic router (ER) credits that the receiver may have. If the receiver does not have any ER credits, then receiver may send to the second sender a congestion indicator as well. The congestion indicator may be a congestion flag as discussed earlier.

In step 1110, flow control logic 902 at the receiver may determine whether the first message is complete. In one example, a message may be deemed as completed once the receiver has received an end of message packet from the sender. Referring now to FIG. 11, congestion management logic 904 at the receiver may determine whether the receiver has any ER credits available. If no, then the receiver may wait for a predetermine time period and check the status of the ER credits again. Once the ER credits are available, the receiver may transmit to the second sender an explicit retransmit request. In step 1116, congestion management logic 904 may also assign the highest priority to the flow from the second sender for a configurable time period. As discussed earlier, which one of the senders is selected for the next flow of packets may be determined by the receiver based on inputs from the application logic corresponding to the service that is being accelerated. In one example, the application logic (e.g., application logic 608 of FIG. 6) may correspond to a service, such as a search results ranking service. As discussed earlier, such service may be divided up and mapped into multiple accelerator component's roles. The application logic may be conceptualized as including an application domain (e.g., a "role"). The application domain or role can represent a portion of functionality included in a composed service spread out over a plurality of acceleration components (which may act as endpoints in a network). Roles at each acceleration component in a group of acceleration components may be linked together to create a group that provides the service acceleration for the application domain. Each application domain may host application logic to perform service specific tasks (such as a portion of functionality for ranking documents, encrypting data, compressing data, facilitating computer vision, facilitating speech translation, machine learning, etc.). In one example, for the search service, application logic may keep track of time stamps associated with search service requests. These time stamps or derivatives thereof may be provided to a receiver, which may use this information to prioritize as to which sender gets to transmit a message. As an example, a sender with the oldest requests as represented by the time stamps or the derivatives thereof may be prioritized over other senders that are in a tracking queue associated with the receiver. Although FIGS. 11A and 11 show a certain number of steps being performed in a certain manner, additional or fewer steps may be performed in a different manner to achieve congestion control and flow control.

In conclusion, a system including a software plane including a plurality of host components configured to execute instructions corresponding to at least one service and an acceleration plane including a plurality of acceleration components configurable to accelerate the at least one service is provided. Each of the plurality of acceleration components may be configurable as a sending acceleration component for sending messages for the at least one service or as a receiving acceleration component for receiving messages for the at least one service. Each of the messages may comprise a plurality of packets having an inter-packet gap. A sending acceleration component may be configured to operate in a first mode for the at least one service or in a second mode for the at least one service. In the first mode, the sending acceleration component may be configured to, in response to receiving a first indication from the receiving acceleration component, send subsequent packets corresponding to a first message associated with the at least one service using a larger inter-packet gap than an inter-packet gap used for previous packets corresponding to the first message associated with the at least one service. In the second mode, the sending acceleration component may be configured to, in response to receiving a second indication from the receiving acceleration component, delay for a configurable amount of time a transmission of a next packet corresponding to the first message associated with the at least one service.

In the second mode, the receiving acceleration component is further configured to track the sending acceleration component and at least a subset of other sending acceleration components that previously attempted to send at least one message to the receiving acceleration component and at least one packet corresponding to the at least one message was dropped. In addition, in the second mode the receiving acceleration component is further configured to maintain a queue comprising an identifier corresponding to each tracked sending acceleration component. Additionally, upon a receipt of an entirety of the first message, the receiving acceleration component is further configured to, based on at least one criteria, dynamically determine which one of the tracked sending acceleration components is moved to a head of the queue. The criteria may comprise at least one input provided by an application logic corresponding to the at least one service. The at least service may comprise a search service for serving search requests and the at least one input may comprise time stamps associated with the search requests.

The first indication comprises at least one of an expiration of a timer associated with a transmission of the first message, an explicit congestion notification from an elastic router associated with the receiving acceleration component, or an explicit retransmission request for retransmitting at least one packet associated with the first message.

In the first mode, a sending acceleration component is configured to delay a transmission of a next packet corresponding to a message based on a status of any receiving acceleration components that the sending acceleration component is transmitting a message to or has previously attempted to transmit a message to and a packet corresponding to the message was dropped.

In another example, the present disclosure relates to a method in a system comprising a plurality of endpoints coupled via a network, where each of the plurality of the endpoints may be configurable as a sending endpoint for sending messages or as a receiving endpoint for receiving messages, and where each of the messages comprises a plurality of packets. The method may include a first sending endpoint initiating transmission of first packets corresponding to a first message to a first receiving endpoint. The method may further include the first receiving endpoint storing the first packets in a first buffer associated with the first receiving endpoint and the first receiving endpoint transmitting a first indication to the first sending endpoint in response to the first buffer meeting a predetermined condition. The method may include the first sending endpoint increasing an amount of an inter-packet gap between successive first packets in response to the first indication. The method may further include a second sending endpoint initiating transmission of second packets corresponding to a second message to the first receiving endpoint. The method may further include if the first receiving endpoint is still receiving the first packets corresponding to the first message from the first sending endpoint, then the first receiving endpoint dropping the second packets and transmitting a second indication to the second sending endpoint. The method may further include the second sending endpoint processing the second indication and if the second indication corresponds to a first value, then the second sending endpoint delaying a transmission of a next second packet for a back-off period and transmitting the next second packet after an expiration of the back-off period, otherwise if the second indication corresponds to a second value, then the second sending endpoint not only delaying a transmission of the next second packet for a back-off period and transmitting the next second packet after an expiration of the back-off period, but also increasing an amount of an inter-packet gap between successive second packets.

The first predetermined condition comprises the first buffer filling up to a first threshold. The first indication comprises at least one of an expiration of a timer associated with a transmission of the first message, an explicit congestion notification from an elastic router associated with the receiving endpoint, or an explicit retransmission request for retransmitting at least one packet associated with the first message.

The method may further include the first receiving endpoint placing an identifier corresponding to the second sending endpoint in a queue for tracking any sending endpoints that previously attempted to send at least one message to the first receiving endpoint. The method may further include the first receiving endpoint based on at least one criteria dynamically determining which one of tracked sending endpoints is moved to a head of the queue. Each of the plurality of endpoints may comprise an acceleration component for accelerating at least one service, and where the at least one criteria comprises at least one input provided by an application logic corresponding to the at least one service. The at least one service comprises a search service for serving search requests and wherein the at least one input comprises time stamps associated with the search requests.

The method may further include the first receiving endpoint transmitting a third indication to each one of tracked sending endpoints, wherein the third indication corresponds to a dynamically determined back-off method and corresponding parameters. The back-off method comprises at least one of a linear back-off method or an exponential back-off method.

In yet another example, the present disclosure relates to a method in a system comprising a plurality of endpoints coupled via a network, where each of the plurality of the endpoints is configurable as a sending endpoint for sending messages or as a receiving endpoint for receiving messages, and where each of the messages comprises a plurality of packets. The method may include a first sending endpoint initiating transmission of first packets corresponding to a first message to a first receiving endpoint. The method may further include the first receiving endpoint storing the first packets in a first buffer associated with the first receiving endpoint and the first receiving endpoint transmitting a first indication to the first sending endpoint in response to the first buffer meeting a predetermined condition, where the first indication comprises at least one of an expiration of a timer associated with a transmission of the first message, an explicit congestion notification from an elastic router associated with the receiving endpoint, or an explicit retransmission request for retransmitting at least one packet associated with the first message. The method may further include the first sending endpoint dynamically determining a back-off method and corresponding parameters for increasing an amount of an inter-packet gap between successive first packets in response to the first indication.

The back-off method comprises at least one of a linear back-off method or an exponential back-off method. In addition, in one example, the inter-packet gap corresponds to a delay value, and where the linear back-off comprises adding additional delay to the delay value to increase the inter-packet gap, and wherein the exponential back-off comprises multiplying the delay value by a factor to increase the inter-packet gap.

It is to be understood that the systems, methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A system comprising:
 a software plane including a plurality of host components configured to execute instructions corresponding to at least one service; and
 an acceleration plane including a plurality of acceleration components configurable to accelerate the at least one service, wherein each of the plurality of acceleration components is configurable as a sending acceleration component for sending messages for the at least one service or as a receiving acceleration component for receiving messages for the at least one service, and wherein each of the messages comprises a plurality of packets having an inter-packet gap, and wherein a sending acceleration component is configured to operate in a first mode for the at least one service or in a second mode for the at least one service,
 wherein in the first mode the sending acceleration component is configured to, in response to receiving a first indication from the receiving acceleration component, send subsequent packets corresponding to a first message associated with the at least one service using a larger inter-packet gap than an inter-packet gap used for previous packets corresponding to the first message associated with the at least one service, and
 wherein in the second mode the sending acceleration component is configured to, in response to receiving a second indication from the receiving acceleration component, delay for a configurable amount of time a transmission of a next packet corresponding to the first message associated with the at least one service, and wherein in the second mode the receiving acceleration component is further configured to track the sending acceleration component and at least a subset of other sending acceleration components that previously attempted to send at least one message to the receiving acceleration component and at least one packet corresponding to the at least one message was dropped.

2. The system of claim 1, wherein in the second mode the receiving acceleration component is further configured to maintain a queue comprising an identifier corresponding to each tracked sending acceleration component.

3. The system of claim 2, wherein upon a receipt of an entirety of the first message, the receiving acceleration component is further configured to, based on at least one criteria, dynamically determine which one of the tracked sending acceleration components is moved to a head of the queue.

4. The system of claim 3, wherein the criteria comprises at least one input provided by an application logic corresponding to the at least one service.

5. The system of claim 4, wherein the at least service comprises a search service for serving search requests and wherein the at least one input comprises time stamps associated with the search requests.

6. The system of claim 1, wherein the first indication comprises at least one of an expiration of a timer associated with a transmission of the first message, an explicit congestion notification from an elastic router associated with the receiving acceleration component, or an explicit retransmission request for retransmitting at least one packet associated with the first message.

7. The system of claim 1, wherein in the first mode a sending acceleration component is configured to delay a transmission of a next packet corresponding to a message based on a status of any receiving acceleration components that the sending acceleration component is transmitting a message to or has previously attempted to transmit a message to and a packet corresponding to the message was dropped.

8. A method in a system comprising a plurality of endpoints coupled via a network, wherein each of the plurality of the endpoints is configurable as a sending endpoint for sending messages or as a receiving endpoint for receiving messages, wherein each of the messages comprises a plurality of packets, and wherein the method comprising:
a first sending endpoint initiating transmission of first packets corresponding to a first message to a first receiving endpoint;
the first receiving endpoint storing the first packets in a first buffer associated with the first receiving endpoint and the first receiving endpoint transmitting a first indication to the first sending endpoint in response to the first buffer meeting a predetermined condition;
the first sending endpoint increasing an amount of an inter-packet gap between successive first packets in response to the first indication;
a second sending endpoint initiating transmission of second packets corresponding to a second message to the first receiving endpoint;
if the first receiving endpoint is still receiving the first packets corresponding to the first message from the first sending endpoint, then the first receiving endpoint dropping the second packets and transmitting a second indication to the second sending endpoint; and
the second sending endpoint processing the second indication and if the second indication corresponds to a first value, then the second sending endpoint delaying a transmission of a next second packet for a back-off period and transmitting the next second packet after an expiration of the back-off period, otherwise if the second indication corresponds to a second value, then the second sending endpoint not only delaying a transmission of the next second packet for a back-off period and transmitting the next second packet after an expiration of the back-off period, but also increasing an amount of an inter-packet gap between successive second packets.

9. The method of claim 8, wherein the first predetermined condition comprises the first buffer filling up to a first threshold.

10. The method of claim 8, wherein the first indication comprises at least one of an expiration of a timer associated with a transmission of the first message, an explicit congestion notification from an elastic router associated with the receiving endpoint, or an explicit retransmission request for retransmitting at least one packet associated with the first message.

11. The method of claim 8 further comprising the first receiving endpoint placing an identifier corresponding to the second sending endpoint in a queue for tracking any sending endpoints that previously attempted to send at least one message to the first receiving endpoint.

12. The method of claim 11 further comprising the first receiving endpoint based on at least one criteria dynamically determining which one of tracked sending endpoints is moved to a head of the queue.

13. The method of claim 12, wherein each of the plurality of endpoints comprises an acceleration component for accelerating at least one service, and wherein the at least one criteria comprises at least one input provided by an application logic corresponding to the at least one service.

14. The method of claim 13, wherein the at least one service comprises a search service for serving search requests and wherein the at least one input comprises time stamps associated with the search requests.

15. The method of claim 8 further comprising the first receiving endpoint transmitting a third indication to each one of tracked sending endpoints, wherein the third indication corresponds to a dynamically determined back-off method and corresponding parameters.

16. The method of claim 15, wherein the back-off method comprises at least one of a linear back-off method or an exponential back-off method.

17. A system comprising:
a software plane including a plurality of host components configured to execute instructions corresponding to at least one service; and
an acceleration plane including a plurality of acceleration components configurable to accelerate the at least one service, wherein each of the plurality of acceleration components is configurable as a sending acceleration component for sending messages for the at least one service or as a receiving acceleration component for receiving messages for the at least one service, and wherein each of the messages comprises a plurality of packets having an inter-packet gap, and wherein a sending acceleration component is configured to, in response to receiving an indication from the receiving acceleration component, send subsequent packets corresponding to a first message associated with the at least one service using a larger inter-packet gap than an inter-packet gap used for previous packets corresponding to the first message associated with the at least one service, and wherein the receiving acceleration component is configured to track the sending acceleration component and at least a subset of other sending acceleration components that previously attempted to send at least one message to the receiving acceleration component and at least one packet corresponding to the at least one message was dropped.

18. The system of claim 17, wherein in the receiving acceleration component is further configured to maintain a queue comprising an identifier corresponding to each tracked sending acceleration component.

19. The system of claim 18, wherein upon a receipt of an entirety of a message, the receiving acceleration component is further configured to, based on at least one criteria, dynamically determine which one of the tracked sending acceleration components is moved to a head of the queue.

* * * * *